(12) United States Patent
Nielsen et al.

(10) Patent No.: US 9,317,830 B2
(45) Date of Patent: Apr. 19, 2016

(54) METHODS AND APPARATUS FOR ANALYZING LOCATE AND MARKING OPERATIONS

(71) Applicant: CertusView Technologies, LLC, Palm Beach Gardens, FL (US)

(72) Inventors: Steven Nielsen, North Palm Beach, FL (US); Curtis Chambers, Palm Beach Gardens, FL (US); Jeffrey Farr, Royal Palm Beach, FL (US); David Pennington, Huntsville, AL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 21 days.

(21) Appl. No.: 14/665,518

(22) Filed: Mar. 23, 2015

(65) Prior Publication Data
US 2015/0193717 A1 Jul. 9, 2015

Related U.S. Application Data

(63) Continuation of application No. 14/075,011, filed on Nov. 8, 2013, now Pat. No. 8,990,100, which is a continuation of application No. 12/572,260, filed on Oct. 1, 2009, now Pat. No. 8,612,271, which is a
(Continued)

(51) Int. Cl.
*G06Q 10/00* (2012.01)
*G06Q 10/06* (2012.01)

(52) U.S. Cl.
CPC ...... *G06Q 10/06395* (2013.01); *G06Q 10/0639* (2013.01)

(58) Field of Classification Search
None
See application file for complete search history.

(56) References Cited

U.S. PATENT DOCUMENTS

| 4,208,653 | A | * | 6/1980 | Abe | 340/870.02 |
| 4,455,509 | A | * | 6/1984 | Crum et al. | 315/119 |
| 5,103,920 | A | | 4/1992 | Patton | |

(Continued)

FOREIGN PATENT DOCUMENTS

| CA | 2386200 | 4/2000 |
| CA | 2435290 | 8/2002 |

(Continued)

OTHER PUBLICATIONS

S. Bauer et al., "Quantification of groundwater contamination in an urban area using integral pumping tests" Journal of Contaminant Hydrology; vol. 75, Issues 3-4; Dec. 2004, pp. 183-213.*

(Continued)

*Primary Examiner* — Gurkanwaljit Singh

(57) ABSTRACT

Methods and apparatus to evaluate a quality of a locate and/or marking operation performed at a work site of proposed excavation in response to a locate request ticket. A display device displays a first portion of a graphical user interface based on first information from the locate request ticket, and further displays a second portion of the graphical user interface based on second information relating to the locate and/or marking operation as performed at the work site by a field technician. One or more indications of a quality assessment of the locate and/or marking operation are generated based on a comparison of at least some of the first information and at least some of the second information, and an electronic record of the quality assessment is stored and/or transmitted based on the indication(s).

30 Claims, 12 Drawing Sheets

Related U.S. Application Data continuation-in-part of application No. 12/572,202, filed on Oct. 1, 2009, said application No. 12/572,260 is a continuation-in-part of application No. 12/571,356, filed on Sep. 30, 2009, and a continuation-in-part of application No. 12/493,109, filed on Jun. 26, 2009, which is a continuation-in-part of application No. 12/204,454, filed on Sep. 4, 2008, said application No. 12/571,356 is a continuation-in-part of application No. 12/569,192, filed on Sep. 29, 2009, now Pat. No. 8,620,587, and a continuation-in-part of application No. 12/568,087, filed on Sep. 28, 2009, now Pat. No. 8,965,700, and a continuation-in-part of application No. 12/539,497, filed on Aug. 11, 2009, now Pat. No. 8,280,631.

(60) Provisional application No. 61/102,186, filed on Oct. 2, 2008, provisional application No. 61/102,169, filed on Oct. 2, 2008, provisional application No. 61/076,253, filed on Jun. 27, 2008, provisional application No. 61/102,122, filed on Oct. 2, 2008, provisional application No. 61/102,205, filed on Oct. 2, 2008, provisional application No. 61/102,151, filed on Oct. 2, 2008.

(56) References Cited

U.S. PATENT DOCUMENTS

| | | | |
|---|---|---|---|
| 5,486,067 A | 1/1996 | Huynh | |
| 5,918,565 A | 7/1999 | Casas | |
| 6,074,693 A | 6/2000 | Manning | |
| 6,138,906 A | 10/2000 | DeMayo | |
| 6,169,517 B1 | 1/2001 | Eslambolchi | |
| 6,353,767 B1 | 3/2002 | Wakeman et al. | |
| 6,421,725 B1 | 7/2002 | Vermilyea et al. | |
| 6,437,708 B1 | 8/2002 | Brouwer | |
| 6,512,312 B1* | 1/2003 | Herkenrath et al. | 307/326 |
| 6,526,443 B1 | 2/2003 | Goldsmith et al. | |
| 6,526,526 B1* | 2/2003 | Dong et al. | 714/46 |
| 6,578,005 B1 | 6/2003 | Lesaint et al. | |
| 6,601,017 B1 | 7/2003 | Kennedy et al. | |
| 6,684,250 B2 | 1/2004 | Anderson | |
| 6,748,340 B2 | 6/2004 | Otsuki | |
| 6,751,553 B2 | 6/2004 | Young | |
| 6,751,554 B1 | 6/2004 | Asher et al. | |
| 6,845,148 B1 | 1/2005 | Beamon | |
| 6,915,211 B2* | 7/2005 | Kram et al. | 702/5 |
| 6,938,048 B1 | 8/2005 | Jilk et al. | |
| 6,949,052 B2 | 9/2005 | Millington et al. | |
| 6,958,690 B1 | 10/2005 | Asher et al. | |
| 6,980,929 B2* | 12/2005 | Aronstam et al. | 702/188 |
| 6,999,021 B2 | 2/2006 | Taylor, Jr. | |
| 7,003,443 B2 | 2/2006 | Ford | |
| 7,003,475 B1 | 2/2006 | Friedland et al. | |
| 7,079,990 B2 | 7/2006 | Haller et al. | |
| 7,236,863 B2 | 6/2007 | LaPorte et al. | |
| 7,324,905 B2 | 1/2008 | Droubie | |
| 7,372,247 B1 | 5/2008 | Giusti et al. | |
| 7,398,184 B1 | 7/2008 | Chen | |
| 7,400,976 B2 | 7/2008 | Young et al. | |
| 7,469,247 B2 | 12/2008 | Cossins et al. | |
| 7,532,127 B2* | 5/2009 | Holman et al. | 340/686.1 |
| 7,626,496 B1 | 12/2009 | Asher et al. | |
| 7,640,105 B2 | 12/2009 | Nielsen et al. | |
| 7,664,530 B2 | 2/2010 | Skelton | |
| 7,741,848 B1 | 6/2010 | Olsson | |
| 7,773,095 B1 | 8/2010 | Badrak et al. | |
| 7,889,124 B2 | 2/2011 | Islam et al. | |
| 7,986,246 B2 | 7/2011 | Angelis et al. | |
| 7,990,151 B2 | 8/2011 | Olsson | |
| 8,040,272 B1 | 10/2011 | Clodfelter et al. | |
| 8,060,304 B2 | 11/2011 | Nielsen et al. | |
| 8,077,072 B2 | 12/2011 | Mohamadi et al. | |
| 8,127,865 B2* | 3/2012 | Watson et al. | 175/62 |
| 8,155,390 B2 | 4/2012 | Nielsen et al. | |
| 8,194,932 B2 | 6/2012 | Nielsen et al. | |
| 8,218,827 B2 | 7/2012 | Nielsen et al. | |
| 8,249,306 B2 | 8/2012 | Nielsen et al. | |
| 8,260,489 B2 | 9/2012 | Nielsen et al. | |
| 8,265,344 B2 | 9/2012 | Nielsen et al. | |
| 8,270,666 B2 | 9/2012 | Nielsen et al. | |
| 8,280,117 B2 | 10/2012 | Nielsen et al. | |
| 8,280,631 B2 | 10/2012 | Nielsen et al. | |
| 8,280,969 B2 | 10/2012 | Nielsen et al. | |
| 8,290,204 B2 | 10/2012 | Nielsen et al. | |
| 8,290,215 B2 | 10/2012 | Nielsen et al. | |
| 8,296,308 B2 | 10/2012 | Nielsen et al. | |
| 8,300,895 B2 | 10/2012 | Nielsen et al. | |
| 8,301,380 B2 | 10/2012 | Nielsen et al. | |
| 8,311,765 B2 | 11/2012 | Nielsen et al. | |
| 8,340,359 B2 | 12/2012 | Nielsen et al. | |
| 8,355,542 B2 | 1/2013 | Nielsen et al. | |
| 8,356,255 B2 | 1/2013 | Nielsen et al. | |
| 8,361,543 B2 | 1/2013 | Nielsen et al. | |
| 8,374,789 B2 | 2/2013 | Nielsen et al. | |
| 8,384,742 B2 | 2/2013 | Nielsen et al. | |
| 8,386,178 B2 | 2/2013 | Nielsen et al. | |
| 8,401,791 B2 | 3/2013 | Nielsen et al. | |
| 8,407,001 B2 | 3/2013 | Nielsen et al. | |
| 8,416,995 B2 | 4/2013 | Nielsen et al. | |
| 8,457,893 B2 | 6/2013 | Nielsen et al. | |
| 8,463,487 B2 | 6/2013 | Nielsen et al. | |
| 8,467,932 B2 | 6/2013 | Nielsen et al. | |
| 8,467,969 B2 | 6/2013 | Nielsen et al. | |
| 8,468,206 B2 | 6/2013 | Nielsen et al. | |
| 8,473,148 B2 | 6/2013 | Nielsen et al. | |
| 8,473,209 B2 | 6/2013 | Nielsen et al. | |
| 8,476,906 B2 | 7/2013 | Nielsen et al. | |
| 8,478,523 B2 | 7/2013 | Nielsen et al. | |
| 8,478,524 B2 | 7/2013 | Nielsen et al. | |
| 8,478,525 B2 | 7/2013 | Nielsen et al. | |
| 8,478,617 B2 | 7/2013 | Nielsen et al. | |
| 8,478,635 B2 | 7/2013 | Nielsen et al. | |
| 8,480,332 B2 | 7/2013 | Miller | |
| 8,484,300 B2 | 7/2013 | Nielsen et al. | |
| 8,532,341 B2 | 9/2013 | Nielsen et al. | |
| 8,532,342 B2 | 9/2013 | Nielsen et al. | |
| 8,540,141 B2 | 9/2013 | Petrich et al. | |
| 8,543,651 B2 | 9/2013 | Nielsen et al. | |
| 8,543,937 B2 | 9/2013 | Nielsen et al. | |
| 8,549,084 B2 | 10/2013 | Nielsen et al. | |
| 8,560,164 B2 | 10/2013 | Nielsen et al. | |
| 8,566,737 B2 | 10/2013 | Nielsen et al. | |
| 8,572,193 B2 | 10/2013 | Nielsen et al. | |
| 8,577,707 B2 | 11/2013 | Nielsen et al. | |
| 8,583,264 B2 | 11/2013 | Nielsen et al. | |
| 8,583,372 B2 | 11/2013 | Nielsen et al. | |
| 8,589,201 B2 | 11/2013 | Nielsen et al. | |
| 8,589,202 B2 | 11/2013 | Nielsen et al. | |
| 8,600,526 B2 | 12/2013 | Nielsen et al. | |
| 8,600,848 B2 | 12/2013 | Nielsen et al. | |
| 8,612,090 B2 | 12/2013 | Nielsen et al. | |
| 8,612,148 B2 | 12/2013 | Nielsen et al. | |
| 8,612,271 B2 | 12/2013 | Nielsen et al. | |
| 8,612,276 B1 | 12/2013 | Nielsen et al. | |
| 8,620,572 B2 | 12/2013 | Nielsen et al. | |
| 8,620,587 B2 | 12/2013 | Nielsen et al. | |
| 8,620,616 B2 | 12/2013 | Nielsen et al. | |
| 8,620,726 B2 | 12/2013 | Nielsen et al. | |
| 8,626,571 B2 | 1/2014 | Nielsen et al. | |
| 8,630,463 B2 | 1/2014 | Nielsen et al. | |
| 8,644,965 B2 | 2/2014 | Nielsen et al. | |
| 8,700,325 B2 | 4/2014 | Nielsen et al. | |
| 8,731,830 B2 | 5/2014 | Nielsen et al. | |
| 8,731,999 B2 | 5/2014 | Nielsen et al. | |
| 8,805,640 B2 | 8/2014 | Nielsen et al. | |
| 8,861,794 B2 | 10/2014 | Nielsen et al. | |
| 8,861,795 B2 | 10/2014 | Nielsen et al. | |
| 8,917,288 B2 | 12/2014 | Nielsen et al. | |
| 8,918,898 B2 | 12/2014 | Nielsen et al. | |
| 8,924,154 B2 | 12/2014 | Nielsen et al. | |
| 8,928,693 B2 | 1/2015 | Nielsen et al. | |
| 8,934,678 B2 | 1/2015 | Nielsen et al. | |

(56) References Cited

U.S. PATENT DOCUMENTS

| | | | |
|---|---|---|---|
| 8,938,366 B2 | 1/2015 | Nielsen et al. | |
| 8,965,700 B2 | 2/2015 | Nielsen et al. | |
| 8,977,558 B2 | 3/2015 | Nielsen et al. | |
| 8,990,100 B2 | 3/2015 | Nielsen et al. | |
| 2002/0029161 A1 | 3/2002 | Brodersen | |
| 2002/0032028 A1* | 3/2002 | Kaupe | 455/427 |
| 2002/0038076 A1* | 3/2002 | Sheehan et al. | 600/200 |
| 2002/0055870 A1 | 5/2002 | Thomas | |
| 2002/0153134 A1* | 10/2002 | Newman | 166/53 |
| 2002/0184235 A1 | 12/2002 | Young | |
| 2003/0110184 A1 | 6/2003 | Gibson et al. | |
| 2003/0130820 A1 | 7/2003 | Lane, III | |
| 2003/0168834 A1 | 9/2003 | Ulrich | |
| 2003/0177027 A1 | 9/2003 | DiMarco | |
| 2003/0177051 A1 | 9/2003 | Driscoll et al. | |
| 2003/0212621 A1 | 11/2003 | Poulter et al. | |
| 2003/0216949 A1* | 11/2003 | Kram et al. | 705/5 |
| 2004/0215701 A1 | 10/2004 | Vrajich | |
| 2004/0236620 A1 | 11/2004 | Chauhan et al. | |
| 2005/0033620 A1 | 2/2005 | Gloor et al. | |
| 2005/0057745 A1 | 3/2005 | Bontje | |
| 2005/0232475 A1 | 10/2005 | Floeder | |
| 2005/0240649 A1* | 10/2005 | Elkington et al. | 709/200 |
| 2006/0026020 A1 | 2/2006 | Waite et al. | |
| 2006/0077095 A1 | 4/2006 | Tucker et al. | |
| 2006/0085133 A1 | 4/2006 | Young | |
| 2006/0085396 A1 | 4/2006 | Evans | |
| 2006/0087402 A1 | 4/2006 | Manning | |
| 2006/0091888 A1* | 5/2006 | Holman et al. | 324/326 |
| 2006/0206370 A1 | 9/2006 | Skopal | |
| 2006/0235741 A1* | 10/2006 | Deaton et al. | 705/10 |
| 2006/0245572 A1 | 11/2006 | Asher | |
| 2006/0282280 A1* | 12/2006 | Stotz et al. | 705/1 |
| 2007/0127694 A1 | 6/2007 | Hajj et al. | |
| 2007/0219722 A1 | 9/2007 | Sawyer, Jr. | |
| 2008/0010009 A1 | 1/2008 | Miyoshi | |
| 2008/0017416 A1* | 1/2008 | Watson et al. | 175/62 |
| 2008/0025614 A1* | 1/2008 | Hintz et al. | 382/189 |
| 2008/0121684 A1 | 5/2008 | Gualandri | |
| 2008/0137589 A1* | 6/2008 | Barrett | 370/327 |
| 2008/0288267 A1 | 11/2008 | Asher | |
| 2009/0157746 A1 | 6/2009 | More et al. | |
| 2009/0201311 A1 | 8/2009 | Nielsen et al. | |
| 2009/0204238 A1 | 8/2009 | Nielsen et al. | |
| 2009/0204466 A1 | 8/2009 | Nielsen et al. | |
| 2009/0207019 A1 | 8/2009 | Nielsen et al. | |
| 2009/0210285 A1 | 8/2009 | Nielsen et al. | |
| 2009/0210298 A1 | 8/2009 | Nielsen et al. | |
| 2009/0223355 A1* | 9/2009 | Manders | 89/1.13 |
| 2009/0265430 A1 | 10/2009 | Bechtel | |
| 2009/0289637 A1 | 11/2009 | Radtke | |
| 2009/0327024 A1 | 12/2009 | Nielsen et al. | |
| 2010/0006667 A1 | 1/2010 | Nielsen et al. | |
| 2010/0010862 A1 | 1/2010 | Nielsen et al. | |
| 2010/0010863 A1 | 1/2010 | Nielsen et al. | |
| 2010/0010882 A1 | 1/2010 | Nielsen et al. | |
| 2010/0010883 A1 | 1/2010 | Nielsen et al. | |
| 2010/0034483 A1 | 2/2010 | Giuffrida | |
| 2010/0088134 A1 | 4/2010 | Nielsen et al. | |
| 2010/0088164 A1 | 4/2010 | Nielsen et al. | |
| 2010/0090700 A1 | 4/2010 | Nielsen et al. | |
| 2010/0097224 A1 | 4/2010 | Prodanovich | |
| 2010/0146454 A1 | 6/2010 | Sugahara | |
| 2010/0164787 A1 | 7/2010 | Khosravy et al. | |
| 2010/0170453 A1* | 7/2010 | Betzer-Zilevitch | 122/6 R |
| 2010/0188088 A1 | 7/2010 | Nielsen et al. | |
| 2010/0188407 A1 | 7/2010 | Nielsen et al. | |
| 2010/0189312 A1 | 7/2010 | Nielsen et al. | |
| 2010/0189887 A1 | 7/2010 | Nielsen et al. | |
| 2010/0198663 A1 | 8/2010 | Nielsen et al. | |
| 2010/0201690 A1 | 8/2010 | Nielsen et al. | |
| 2010/0205031 A1 | 8/2010 | Nielsen et al. | |
| 2010/0205032 A1 | 8/2010 | Nielsen et al. | |
| 2010/0245086 A1 | 9/2010 | Nielsen et al. | |
| 2010/0253511 A1 | 10/2010 | Nielsen et al. | |
| 2010/0253513 A1 | 10/2010 | Nielsen et al. |
| 2010/0253514 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0093306 A1 | 4/2011 | Nielsen et al. |
| 2011/0279229 A1 | 11/2011 | Nielsen et al. |
| 2011/0279230 A1 | 11/2011 | Nielsen et al. |
| 2011/0283217 A1 | 11/2011 | Nielsen et al. |
| 2011/0285749 A1 | 11/2011 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0328162 A1 | 12/2012 | Nielsen et al. |
| 2013/0006718 A1 | 1/2013 | Nielsen et al. |
| 2013/0265138 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0278661 A1 | 9/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |

FOREIGN PATENT DOCUMENTS

| | | |
|---|---|---|
| CA | 2458050 | 3/2003 |
| CA | 2641355 | 8/2007 |
| WO | WO9516827 | 6/1995 |
| WO | WO0228541 | 4/2002 |
| WO | WO2006013338 | 2/2006 |

OTHER PUBLICATIONS

Holder, T., Teutsch, G., Ptak, T., Schwarz, R., 1998. A new approach for source zone characterization: the Neckar Valley study. Groundwater Quality: Remediation and Protection, IAHS Publication, vol. 250. IAHS Press, Wallingford, Oxfordshire, UK, pp. 49-55.*

Schwarz, R., Ptak, T., Holder, T., Teutsch, G., 1998. Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.*

Mike Herbert, Karel Kovar, Universität Tübingen Geological Institute "Groundwater QUality: Remediation and Protection" IAHS Publication No. 250 (1998).*

Imran Maqsood, Jianbing Li, Guohe Huang and Yuefei Huang "Simulation-based risk assessment of contaminated sites under remediation scenarios, planning periods, and land-use patterns—a Canadian case study" Stochastic Environmental Research and Risk Assessment, vol. 19, No. 2 (May 2005).*

U.S. Appl. No. 14/332,352, filed Jul. 15, 2014, Nielsen et al.

(56) References Cited

OTHER PUBLICATIONS

U.S. Appl. No. 14/579,223, filed Dec. 22, 2014, Nielsen et al.
Common Ground Alliance, Mar. 2008, "Best Practices Version 5.0", archived online: CGA | Best Practices 2008 <http://web.archive.org/web/20101009040317/http://www.commongroundalliance.com/Content/NavigationMenu/Best_Practices_2008/BP_5.0_March2008_Final.pdf[Best Practices 5.0].
Alstete, J.W., Benchmarking in Higher Education: Adapting Best Practices to Improve Quality, ASHE-ERIC Higher Education Report No. 5, 1995, 151 pages.
Bauer, S. et al., "Quantification of groundwater contamination in an urban area using integral pumping tests," Journal of Contaminant Hydrology; vol. 75, Issues 3-4; Dec. 2004, pp. 183-213.
Cardno TBE, "Locating Underground Utilities Before Construction," Airport Facilities, Fall 2004, http://www.subsurfaceutilityengineering.com/articles/Locating_Utilities.asp, 2 pages.
Cardno TBE, "Subsurface Utility Engineering Services," retrieved from http://web.archive.org, Aug. 28, 2008, 38 pages.
CGA, Common Ground Alliance, Best Practices, Version 3.0, Mar. 2006, 100 pages.
CGA, Common Ground Alliance, Best Practices, Version 5.0, Mar. 2008, http://web.archive.org/web/20101009040317/http://www.commongroundalliance.com/Content/NavigationMenu/Best_Practices/Best_Practices_2008/BP_5.0_March2008_Final.pdf.
Charlton, B.G. et al., "Auditing as a tool of public policy—The misuse of quality assurance techniques in the UK university expansion," Final draft of a paper published in European Political Science 2002; 2: 24-35.
Dockter, L., Development of an Underground Utility Damage Prevention Plan (UUDPP) for Company XYZ, The Graduate College, University of Wisconsin-Stout, 2008, http://www2.uwstout.edu/content/lib/thesis/2008/2008dockterl.pdf.
GPS Visualizer: Free geocoder: Convert address to coordinates, http://web.archive.org/web/20070304090412/http://www.gpsvisualizer.com/geocoding.html, Mar. 2007, 1 page.
Haas, J. et al., "Feed the FLAME—Utility Integrates Field Applications," GeoWorld, Mar. 2007, 5 pages, online: Systems Integration Articles/Enspiria Solutions.
Holder, T. et al., A new approach for source zone characterization: the Neckar Valley study. Groundwater Quality: Remediation and Protection, IAHS Publication, vol. 250, IAHS Press, Wallingford, Oxfordshire, UK, pp. 49-55.
International Search Report and Written Opinion, Application No. PCT/2009/05416, Jun. 7, 2010.
International Search Report and Written Opinion, Application No. PCT/2009/05443, Apr. 5, 2010.
International Search Report and Written Opinion, Application No. PCT/US2009/03810, Aug. 17, 2010.
Maqsood, I et al., Simulation-based risk assessment of contaminated sites under remediation scenarios, planning periods, and land-use patterns—a Canadian case study, Stoch Environ Res Risk Assess 2005, 19:146-157.
Mike Herbert, Karel Kovar, Universitat Tubingen Geological Institute "Groundwater Quality: Remediation and Projection" IAHS Publication No. 250, Proceedings of the GQ conference held in Tubingen, German from Sep. 21 to 25, 1998.
Notice of Allowance dated Apr. 17, 2012 from U.S. Appl. No. 12/432,870.
Notice of Allowance dated May 20, 2013 from U.S. Appl. No. 12/432,860.
Notice of Allowance dated Jun. 21, 2013 from U.S. Appl. No. 12/572,260.
Notice of Allowance dated Aug. 1, 2012 from U.S. Appl. No. 12/364,339.
Notice of Allowance dated Aug. 21, 2013 from U.S. Appl. No. 12/850,187.
Notice of Allowance dated Oct. 24, 2014 from U.S. Appl. No. 14/075,011.
Notice of Allowance dated Nov. 26, 2013 from U.S. Appl. No. 12/833,103.
Notice of Allowance dated Dec. 16, 2013 from U.S. Appl. No. 12/704,485.
Office Action dated Jan. 12, 2015 from U.S. Appl. No. 12/571,356.
Office Action dated Jan. 15, 2014 from U.S. Appl. No. 12/432,909.
Office Action dated Jan. 29, 2013 from U.S. Appl. No. 12/704,485.
Office Action dated Feb. 1, 2013 from U.S. Appl. No. 12/850,187.
Office Action dated Feb. 4, 2013 from Canadian Application No. 2,729,590.
Office Action dated Feb. 6, 2013 from U.S. Appl. No. 12/833,121.
Office Action dated Feb. 9, 2015 from Canadian Application No. 2,729,590.
Office Action dated Feb. 11, 2014 from Canadian Application No. 2,729,590.
Office Action dated Feb. 11, 2014 from U.S. Appl. No. 12/432,849.
Office Action dated Feb. 11, 2015 from U.S. Appl. No. 12/493,109.
Office Action dated Feb. 12, 2013 from U.S. Appl. No. 12/833,103.
Office Action dated Feb. 12, 2013 from U.S. Appl. No. 12/833,117.
Office Action dated Feb. 12, 2013 from U.S. Appl. No. 12/833,127.
Office Action dated Feb. 14, 2012 from U.S. Appl. No. 12/833,103.
Office Action dated Feb. 20, 2014 from Canadian Application No. 2,691,780.
Office Action dated Feb. 29, 2012 from U.S. Appl. No. 12/704,485.
Office Action dated Feb. 29, 2012 from U.S. Appl. No. 12/833,117.
Office Action dated Feb. 29, 2012 from U.S. Appl. No. 12/833,127.
Office Action dated Mar. 1, 2012 from U.S. Appl. No. 12/833,121.
Office Action dated Mar. 7, 2014 from U.S. Appl. No. 12/432,878.
Office Action dated Mar. 19, 2012 from U.S. Appl. No. 12/204,454.
Office Action dated Mar. 26, 2014 from U.S. Appl. No. 12/204,454.
Office Action dated Mar. 26, 2014 from U.S. Appl. No. 12/537,917.
Office Action dated Apr. 4, 2012 from U.S. Appl. No. 12/572,202.
Office Action dated Apr. 9, 2014 from U.S. Appl. No. 12/537,732.
Office Action dated Apr. 18, 2013 from U.S. Appl. No. 12/571,356.
Office Action dated Apr. 24, 2013 from U.S. Appl. No. 12/432,909.
Office Action dated Apr. 28, 2011 from U.S. Appl. No. 12/204,454.
Office Action dated Apr. 29, 2013 from U.S. Appl. No. 12/432,849.
Office Action dated May 9, 2012 from U.S. Appl. No. 12/432,909.
Office Action dated May 11, 2012 from Australian Application No. 2009300343.
Office Action dated May 22, 2012 from U.S. Appl. No. 12/432,849.
Office Action dated May 22, 2012 from U.S. Appl. No. 12/572,260.
Office Action dated May 22, 2012 from U.S. Appl. No. 12/432,878.
Office Action dated May 22, 2014 from U.S. Appl. No. 12/850,712.
Office Action dated May 23, 2013 from U.S. Appl. No. 12/572,202.
Office Action dated May 23, 2014 from U.S. Appl. No. 12/537,894.
Office Action dated May 31, 2012 from Australian Application No. 2009300323.
Office Action dated Jun. 1, 2012 from Australian Application No. 2009300342.
Office Action dated Jun. 3, 2013 from Canadian Application No. 2,691,780.
Office Action dated Jun. 10, 2014 from U.S. Appl. No. 13/465,524.
Office Action dated Jun. 14, 2012 from U.S. Appl. No. 12/432,860.
Office Action dated Jun. 19, 2013 from U.S. Appl. No. 12/704,485.
Office Action dated Jun. 19, 2013 from U.S. Appl. No. 12/833,103.
Office Action dated Jun. 20, 2013 from U.S. Appl. No. 12/833,117.
Office Action dated Jun. 20, 2013 from U.S. Appl. No. 12/833,127.
Office Action dated Jun. 25, 2013 from U.S. Appl. No. 12/833,121.
Office Action dated Jul. 9, 2012 from U.S. Appl. No. 12/493,109.
Office Action dated Jul. 12, 2012 from U.S. Appl. No. 12/537,856.
Office Action dated Jul. 16, 2012 from Canadian Application No. 2,691,780.
Office Action dated Jul. 17, 2014 from U.S. Appl. No. 12/537,894.
Office Action dated Jul. 26, 2012 from Canadian Application No. 2,712,126.
Office Action dated Jul. 30, 2014 from U.S. Appl. No. 12/572,202.
Office Action dated Jul. 31, 2012 from U.S. Appl. No. 12/204,454.
Office Action dated Jul. 31, 2014 from U.S. Appl. No. 12/833,117.
Office Action dated Jul. 31, 2014 from U.S. Appl. No. 12/833,121.
Office Action dated Aug. 4, 2014 from U.S. Appl. No. 12/833,127.
Office Action dated Aug. 6, 2012 from U.S. Appl. No. 12/850,187.
Office Action dated Aug. 21, 2012 from U.S. Appl. No. 12/537,894.

(56) References Cited

OTHER PUBLICATIONS

Office Action dated Aug. 21, 2012 from U.S. Appl. No. 12/537,917.
Office Action dated Aug. 21, 2013 from Canadian Application No. 2,739,110.
Office Action dated Aug. 29, 2013 from U.S. Appl. No. 13/465,524.
Office Action dated Sep. 2, 2014 from Canadian Application No. 2,729,590.
Office Action dated Sep. 24, 2013 from Canadian Application No. 2,739,090.
Office Action dated Sep. 24, 2013 from Canadian Application No. 2,739,094.
Office Action dated Sep. 25, 2012 from Australian Application No. 2010214066.
Office Action dated Sep. 26, 2011 from Canadian Application No. 2,739,090.
Office Action dated Sep. 26, 2011 from Canadian Application No. 2,739,110.
Office Action dated Sep. 27, 2011 from Canadian Application No. 2,739,094.
Office Action dated Sep. 29, 2014 from Canadian Application No. 2,691,780.
Office Action dated Oct. 10, 2013 from U.S. Appl. No. 12/850,712.
Office Action dated Oct. 11, 2011 from Canadian Application No. 2,691,780.
Office Action dated Oct. 11, 2011 from U.S. Appl. No. 12/432,849.
Office Action dated Oct. 11, 2011 from U.S. Appl. No. 12/432,878.
Office Action dated Oct. 11, 2011 from U.S. Appl. No. 12/432,909.
Office Action dated Oct. 15, 2012 from U.S. Appl. No. 12/850,712.
Office Action dated Oct. 16, 2013 from Canadian Application No. 2,691,780.
Office Action dated Oct. 31, 2013 from U.S. Appl. No. 12/572,202.
Office Action dated Nov. 7, 2012 from U.S. Appl. No. 12/572,202.
Office Action dated Nov. 12, 2013 from Canadian Application No. 2,712,126.
Office Action dated Nov. 19, 2014 from U.S. Appl. No. 12/204,454.
Office Action dated Nov. 21, 2011 from U.S. Appl. No. 12/204,454.
C108 Office Action dated Dec. 6, 2011 from U.S. Appl. No. 12/432,870.
Office Action dated Dec. 7, 2011 from U.S. Appl. No. 12/537,856.
Office Action dated Dec. 9, 2011 from U.S. Appl. No. 12/493,109.
Office Action dated Dec. 12, 2011 from U.S. Appl. No. 12/537,917.
Office Action dated Dec. 13, 2011 from U.S. Appl. No. 12/537,894.
Office Action dated Dec. 18, 2014 from U.S. Appl. No. 12/537,917.
Office Action dated Dec. 19, 2011 from U.S. Appl. No. 12/571,356.
Office Action dated Dec. 22, 2011 from U.S. Appl. No. 12/537,732.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Patent Examination Report dated Sep. 5, 2014 from Australian Application No. 2010358572.
Patent Examination Report No. 2, Australian Application No. 2009300323, May 29, 2013.
Patent Examination Report No. 2, Australian Application No. 2009300342, Jul. 1, 2013.
Schwarz, R. et al., 1998 Groundwater risk assessment at contaminated sites: a new investigation approach. In: Herbert, M., Kovar, K. (Eds.), GQ'98 Groundwater Quality: Remediation and Protection, IAHS Publication, vol. 250, pp. 68-71.
Stahovich, David M. et al., "Automated and Integrated Call Before You Dig," Proceedings of GITA 2005, GITA's 28th Annual Conference, Mar. 6-9, 2005, Denver, CO, online: GIS for Oil & Gas Conference 2002 <http://www.gisdevelopment.net/proceedings/gita/2005/papers/76.pdf>.
Tetra Tech NUS, "Standard Operation Procedures," Dec. 2003 [retrieved on Jul. 27, 2010, http://htl.mclinc.org/%5CWillowGroveNASAdminRecord%5CPdfs%5CFinal21345_appendA.pdf>, 315 pages.
Turner, R., "Standard Operating Procedures," *Appendix A for Sampling and Analysis Plan for Interim Groundwater Monitoring Site 3—Ninth Street Landfill* (Tetra Tech NUS, 2008), retrieved online at: Horsham Township Library: Willow Grove Naval Air Station Administrative Record Index <http://htl.mclinc.org/%5CWillowGroveNASAdminRecord%5CPdfs%5CFnial21345_appendA.pdf.
Whiting, P., "No role for quality scores in systematic reviews of diagnostic accuracy studies," BMC Medical Research Methodology, 2005, 5:19, 9 pages.
Opinion and Order Following Motion for Judgment on Pleadings, Jan. 21, 2015; Case 2:13-cv-00346-MSD-LRLVAED *CertusView Technologies, LLC v. S&N Locating Services*; (Eastern District of Virginia).
Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit A to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-1 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-2 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-3 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-4 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-5 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-6 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-7 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-8 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-9 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).

(56) References Cited

OTHER PUBLICATIONS

Exhibit J-10 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-11 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-12 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-13 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-14 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-15 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-16 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-17 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-18 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-19 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-20 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-21 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-22 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-23 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
CertusView's Response in Opposition to S&N's Motion for Exceptional Case Finding and Attorneys' Fees filed Feb. 27, 2015; Case 2:13-cv-00346-MSD-TEM; *CertusView Technologies, LLC v. S&N Locating Services, LLC et al.*, (Eastern District of Virginia).
Reply in Support of Defendants' Motion for Exceptional Case Finding and Attorneys' Fees filed Mar. 9, 2015; Case 2:13-cv-00346-MSD-TEM; *CertusView Technologies, LLC v. S&N Locating Services, LLC et al.*, (Eastern District of Virginia).
Memorandum Order regarding Functional Equivalency Objections and Sanctions Objections filed Mar. 11, 2015; Case 2:13-cv-00346-MSD-TEM; *CertusView Technologies, LLC v. S&N Locating Services, LLC et al.*, (Eastern District of Virginia).
Office Action dated Mar. 25, 2015 from U.S. Appl. No. 14/063,417.
S&N Locating Services, LLC's and S&N Communications, Inc.'s First Amended Answer, Affirmative Defenses, and Counterclaims to Plaintiff's First Amended Complaint filed Jan. 23, 2015; Case No. 2:13-cv-346 (MSD) (TEM); *CertusView Technologies, LLC v. S&N Locating Services, LLC et al.*, (Eastern District of Virginia).
CertusView's Objections to the Magistrate Judge's Order (Dkt. No. 248) Allowing S&N's Amended Answer and Counterclaims filed Feb. 2, 2015; Case No. 2:13-cv-346 (MSD) (TEM); *CertusView Technologies, LLC v. S&N Locating Services, LLC et al.*, (Eastern District of Virginia).
Office Action dated Mar. 20, 2015 from U.S. Appl. No. 12/572,202.
Office Action dated Mar. 19, 2015 from U.S. Appl. No. 12/833,121.
Office Action dated Mar. 19, 2015 from U.S. Appl. No. 12/833,127.
Office Action dated Mar. 20, 2015 from U.S. Appl. No. 12/833,117.
Office Action dated Mar. 20, 2015 from Canadian Application No. 2,739,110.
Office Action dated Mar. 17, 2015 from Canadian Application No. 2,712,126.
Office Action dated Mar. 17, 2015 from Canadian Application No. 2,739,090.
Office Action dated Apr. 8, 2015 from U.S. Appl. No. 12/204,454
Office Action dated Apr. 8, 2015 from U.S. Appl. No. 12/432,878.
Opinion and Order to Plaintiff's Rule 72 Objections to the Magistrate Judge's Jan. 16, 2015 Order Granting Defendant's Leave to Amend their Answer and Counterclaims, and on Plaintiff's Motion to Strike and in the Alternative Dismiss S&N's First Amended Answer and Counterclaims, filed May 22, 2015; *CertusView Technologies, LLC v. S&N Locating Services, LLC et al.*, (Eastern District of Virginia).
First Action Interview Pre-Interview Communication dated Apr. 23, 2015 from U.S. Appl. No. 14/332,352.
Office Action dated May 7, 2015 from U.S. Appl. No. 12/537,894.
Office Action dated Apr. 24, 2015 from Canadian Application No. 2,776,434.
Office Action dated Jun. 5, 2015 from U.S. Appl. No. 12/537,856.
Section 330523-1 Guidelines for Utility Horizontal Directional Borings, published on Oct. 26, 2007 at www.nashville.gov, 9 pages.
Grant, Anthony M., Workplace, Executive and Life Coaching: An Annotated Bibliography from the Behavioural Science Literature, Coaching Publications from 1937 to Jul. 2008, 87 pages.
S&N Locating Services, LLC's and S&N Communications, Inc.'s Second Amended answer, Affirmative Defenses, and Counterclaims to Plaintiff's First Amended Complaint filed Jun. 12, 2015; Case No. 2:13-cv-346 (MSD) (TEM); *CertusView Technologies, LLC v. S&N Locating Services, LLC et al.*, (Eastern District of Virginia).
Notice of Filing of Defendants' Second Amended Answer and Counterclaims filed Jun. 12, 2015; Case No. 2:13-cv-346 (MSD) (TEM); *CertusView Technologies, LLC v. S&N Locating Services, LLC et al.*, (Eastern District of Virginia).
CertusView's Reply in Support of its Motion to Strike and in the Alternative Dismiss S&N's First Amended Answer and Counterclaims (Dkt. No. 253) filed Mar. 2, 2015; *CertusView Technologies, LLC v. S&N Locating Services, LLC et al.*, (Eastern District of Virginia).

(56) References Cited

OTHER PUBLICATIONS

CertusView's Request for Leave to File a Sur-Reply in Support of its Opposition to Defendants' Motion for Attorney's Fees filed Mar. 18, 2015; *CertusView Technologies, LLC v. S&N Locating Services, LLC et al.*, (Eastern District of Virginia).

Defendants' Response to CertusView's Motion to Strike and in the Alternative Dismiss S&N's First Amended Answer and Counterclaims (Dkt. No. 253) filed Feb. 23, 2015; *CertusView Technologies, LLC v. S&N Locating Services, LLC et al.*, (Eastern District of Virginia).

Defendant's Response to CertusView's Objections to the Magistrate Judge's Order (Dkt. No. 254) Awarding Sanctions on S&N's Motion to Compel filed Feb. 23, 2015; *CertusView Technologies, LLC v. S&N Locating Services, LLC et al.*, (Eastern District of Virginia).

Patent Examination Report dated Jun. 29, 2015 from Australian Application No. 2014201054.

* cited by examiner

| | |
|---|---|
| Timestamp (2005-10-20 09:43) | Facility Type Identifier (Power) |
| Facility Mark Location (N38° 51.40748, W077°20.27798;...; N38° 51 1.40784, W077°20.27865) ||
| Environmental Landmark Identifier (Curb) ||
| Environmental Landmark Location (N38° 51.40756, W077°20.27805;...; N38° 51 1.40733, W077°20.27858) ||
| Other Information (1.2 Meters Between Curb and Power Line) ||
| Facility Owner/Operator (ABC Corp) | Marking Method (Red Paint) |
| Property Address (555 Main Street, 22220) | Ticket Number (1234567) |
| Location Stamp (N38° 51.40752, W077°20.27840) | Certification (Joe Locator) |

FIG. 6

METHODS AND APPARATUS FOR ANALYZING LOCATE AND MARKING OPERATIONS

CROSS-REFERENCES TO RELATED APPLICATIONS

The present application claims a priority benefit, under 35 U.S.C. §120, as a continuation (CON) of U.S. Non-provisional patent application Ser. No. 14/075,011, filed Nov. 8, 2013, entitled "Methods and Apparatus for Analyzing Locte and Marking Operations with Respect to Environmental Landmarks."

Ser. No. 14/075,011, filed Nov. 8, 2013, claims a priority benefit, under 35 U.S.C. §120, as a continuation (CON) of U.S. Non-provisional patent application Ser. No. 12/572,260, filed Oct. 1, 2009, entitled "Methods and Apparatus for Analyzing Locate and Marking Operations With Respect to Environmental Landmarks."

Ser. No. 12/572,260 claims a priority benefit, under 35 U.S.C. §120, as a continuation-in-part (CIP) of U.S. Non-provisional patent application Ser. No. 12/572,202, filed Oct. 1, 2009, entitled "Methods and Apparatus for Analyzing Locate and Marking Operations With Respect to Historical Information," which in turn claims a priority benefit, under 35 U.S.C. §119(e), of U.S. Provisional Patent Application Ser. No. 61/102,186, filed on Oct. 2, 2008, entitled "Data Acquisition System For And Method Of Analyzing Locate Operations With Respect To Historical Tickets."

Ser. No. 12/572,260 claims a priority benefit, under 35 U.S.C. §120, as a continuation-in-part (CIP) of U.S. Non-provisional patent application Ser. No. 12/571,356, filed Sep. 30, 2009, entitled "Methods and Apparatus for Analyzing Locate and Marking Operations With Respect to Facilities Maps," which in turn claims a priority benefit, under 35 U.S.C. §119(e), of U.S. Provisional Patent Application Ser. No. 61/102,169, filed on Oct. 2, 2008, entitled "Data Acquisition System For And Method Of Analyzing Locate Operations With Respect To Facilities Maps."

Ser. No. 12/571,356 also claims a priority benefit, under 35 U.S.C. §120, as a continuation-in-part (CIP) of U.S. Non-provisional patent application Ser. No. 12/493,109, filed Jun. 26, 2009, entitled "Methods and Apparatus for Quality Assessment of a Field Service Operation."

Ser. No. 12/493,109 also claims a priority benefit, under 35 U.S.C. §120, as a continuation-in-part (CIP) of U.S. Non-provisional patent application Ser. No. 12/204,454, filed Sep. 4, 2008, entitled "Ticket Approval System and Method of Performing Quality Control in Field Service Applications," which in turn claims a priority benefit, under 35 U.S.C. §119 (e), of U.S. Provisional Patent Application Ser. No. 61/076,253, filed on Jun. 27, 2008, entitled "Ticket Approval System and Method of Performing Quality Control in Field Service Applications."

Ser. No. 12/571,356 also claims a priority benefit, under 35 U.S.C. §120, as a continuation-in-part (CIP) of U.S. Non-provisional application Ser. No. 12/569,192, filed on Sep. 29, 2009, entitled "Methods, Apparatus, and Systems for Generating Electronic Records of Locate and Marking Operations, and Combined Locate and Marking Apparatus for Same," which in turn claims the benefit, under 35 U.S.C. §119(e), of U.S. Provisional Application Ser. No. 61/102,122, filed on Oct. 2, 2008, entitled "Combination Locate and Marking Device With a Data Acquisition System Installed Therein, and Associated Methods."

Ser. No. 12/569,192 also claims a priority benefit, under 35 U.S.C. §120, as a continuation-in-part (CIP) of U.S. Non-provisional application Ser. No. 12/568,087, filed on Sep. 28, 2009, entitled "Methods and Apparatus for Generating an Electronic Record of Environmental Landmarks Based on Marking Device Actuations," which in turn claims the benefit, under 35 U.S.C. §119(e), of U.S. Provisional Patent Application Ser. No. 61/102,205, filed Oct. 2, 2008, and entitled "Data Acquisition For And Method Of Analyzing Locate Operations With Respect To Environmental Landmarks."

Ser. No. 12/568,087 also claims a priority benefit, under 35 U.S.C. §120, as a continuation-in-part (CIP) of U.S. Non-provisional application Ser. No. 12/539,497, filed on Aug. 11, 2009, entitled "Methods and Apparatus for Generating an Electronic Record of a Marking Operation based on Marking Device Actuations," which in turn claims the benefit, under 35 U.S.C. §119(e), of U.S. Provisional Application Ser. No. 61/102,151, filed on Oct. 2, 2008, entitled "Data acquisition system for and method of analyzing marking operations based on marking device actuations."

Each of the above-identified applications is incorporated by reference herein in its entirety.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate operation is initiated as a result of an excavator 110 providing an excavation notice to a one-call center 120. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection "polygon maps" which indicate, within a given geographic area over which the one-call center has jurisdiction, generally where underground facilities may be found relative to some geographic reference frame or coordinate system.

Polygon maps typically are provided to the one-call centers by underground facilities owners within the jurisdiction of the one call center ("members" of the one-call center). A one-call center first provides the facility owner/member with one or more maps (e.g., street or property maps) within the jurisdiction, on which are superimposed some type of grid or coordinate system employed by the one-call center as a geographic frame of reference. Using the maps provided by the one-call center, the respective facilities owners/members draw one or more polygons on each map to indicate an area within which their facilities generally are disposed underground (without indicating the facilities themselves). These polygons themselves do not precisely indicate geographic locations of respective underground facilities; rather, the area enclosed by a given polygon generally provides an over-inclusive indication of where a given facilities owner's underground facilities are disposed. Different facilities owners/members may draw polygons of different sizes around areas including their underground facilities, and in some instances such polygons can cover appreciably large geographic regions (e.g., an entire subdivision of a residential area), which may further obfuscate the actual/precise location of respective underground facilities.

Based on the polygon maps collected from the facilities owners/members, the one-call center may in some instances create composite polygon maps to show polygons of multiple different members on a single map. Whether using single member or composite polygon maps, the one-call center examines the address or location information provided in the locate request and identifies a significant buffer zone around an identified work site so as to make an over-inclusive identification of facilities owners/members that may have underground facilities present (e.g., to err on the side of caution). In particular, based on this generally over-inclusive buffer zone around the identified work site (and in some instances significantly over-inclusive buffer zone), the one-call center consults the polygon maps to identify which member polygons intersect with all or a portion of the buffer zone so as to notify these underground facility owners/members and/or their agents of the proposed excavation or design project. Again, it should be appreciated that the buffer zones around an indicated work site utilized by one-call centers for this purpose typically embrace a geographic area that includes but goes well beyond the actual work site, and in many cases the geographic area enclosed by a buffer zone is significantly larger than the actual dig area in which excavation or other similar activities are planned. Similarly, as noted above, the area enclosed by a given member polygon generally does not provide a precise indication of where one or more underground facilities may in fact be found.

In some instances, one-call centers may also or alternatively have access to various existing maps of underground facilities in their jurisdiction, referred to as "facilities maps." Facilities maps typically are maintained by facilities owners/members within the jurisdiction and show, for respective different utility types, where underground facilities purportedly may be found relative to some geographic reference frame or coordinate system (e.g., a grid, a street or property map, GPS latitude and longitude coordinates, etc.). Facilities maps generally provide somewhat more detail than polygon maps provided by facilities owners/members; however, in some instances the information contained in facilities maps may not be accurate and/or complete. For at least this reason, whether using polygon maps or facilities maps, as noted above the one-call center utilizes a significant buffer zone around an identified work site so as to make an over-inclusive identification of facilities owners/members that may have underground facilities present.

Once facilities implicated by the locate request are identified by a one-call center (e.g., via the polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 140 and/or one or more locate service providers 130 (who may be acting as contracted agents of the facility owners) so that they can conduct a locate and marking operation to verify a presence or absence of the underground facilities in the dig area. For example, in some instances, a given underground facility owner 140 may operate its own fleet of locate technicians (e.g., locate technician 145), in which case the one-call center 120 may send the ticket to the underground facility owner 140. In other instances, a given facility owner may contract with a locate service provider to receive locate request tickets and perform a locate and marking operation in response to received tickets on their behalf.

Upon receiving the locate ticket, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. The transmitter is connected via a connection point to a target object (in this example, underground facility) located in the ground, and generates the applied signal coupled to the underground facility via the connection point (e.g., to a tracer wire along the facility), resulting in the generation of a magnetic field. The magnetic field in turn is detected by the locate receiver, which itself may include one or more detection antenna. The locate receiver indicates a presence of a facility when it detects electromagnetic fields arising from the applied signal. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

SUMMARY

As discussed above, in various field service operations, a number of field technicians typically are dispatched to perform field operations at any given time, and over any given time period each technician may be assigned numerous work orders, or "tickets" specifying aspects of the field operations to be performed. The volume of tickets per technician may be particularly high in the construction industry, especially in connection with locate and marking operations. The inventors have recognized and appreciated that implementing and performing meaningful oversight and quality control activities in a timely fashion for several field technicians each performing several field operations in a given time period may present challenges, and that failure to perform meaningful oversight and quality control activities may adversely affect customer satisfaction.

Additionally, the inventors have appreciated that the time, effort, and cost that is associated with re-performing work in the field, or with correcting and/or improving poorly performed field calls, may be unacceptable. Consequently, the inventors have realized that a need exists for methods of providing oversight and quality control in field service operations in order to improve customer satisfaction, to identify and reduce the number of poorly performed tickets, and to improve visibility into distributed workforce operations.

In view of the foregoing, various inventive embodiments disclosed herein relate generally to methods, apparatus and systems for computer-aided determination of quality assessment for locate and marking operations. In some embodiments, a quality assessment decision is solely under the discretion of a human reviewer, albeit facilitated in some respects by computer-aided display of information, and electronic record-keeping and communication functions associated with the quality assessment result(s). In other embodiments, information related to a locate and marking operation is electronically analyzed such that a quality assessment is not based solely on human discretion, but rather based at least in part on some predetermined criteria and/or metrics that facilitate an automated determination of quality assessment.

More specifically, in some embodiments, methods, apparatus and systems according to the present disclosure relate to at least partially automating oversight and quality assessment in underground facility locate applications and/or other field service operations. For example, in some embodiments, an automated quality assessment system may receive information related to a locate and marking operation from one or more sources of electronic data (also referred to herein as "field information" or "field data"), analyze the contents of the received electronic data, and automatically assess the quality of the operation based at least in part on the analysis. In other embodiments, automated analysis of at least some of the received electronic data relating to the locate and marking operation facilitates further analysis and/or quality assessment by a human, in which the quality assessment is not based solely on the discretion of the human, but is significantly informed in some manner by automated analysis of data.

In some exemplary implementations in which a quality of a locate and marking operation is assessed via an at least partially automated process, some or all of the available field information (e.g., which in some instances is derived from data contained in an electronic record of the locate and marking operation) is compared to "reference information" or "reference data" (which in some instances is derived from data contained in a "reference" electronic record). Examples of types of reference information/data used in a quality assessment process according to various embodiments discussed herein may include, but are not limited to: 1) information/data derived from or relating to one or more facilities maps that illustrate the presumed locations of underground facilities purportedly present in a geographic area proximate to or surrounding and subsuming the work site; 2) information/data derived from or relating to one or more previous locate and marking operations at or near the work site (referred to herein as "historical tickets" or "historical data"); and/or 3) information/data relating to one or more environmental landmarks present in a geographic area proximate to or surrounding and subsuming the dig area (e.g., the work site and its environs), or within the dig area itself (referred to herein as "landmark information," which may be available, for example, from facilities maps, historical tickets, and/or field data collected at or around the time of the locate and marking operation being assessed).

In other aspects, the quality assessment of the locate and/or marking operation may be performed, in whole or in part, by one or more analysis components (e.g., one or more processors executing instructions) separate and/or remote from the locate and/or marking device used in connection with the locate and/or marking operation. Alternatively, the assessment may be performed, in whole or in part, by one or more analysis components incorporated within or otherwise coupled to a locate device, a marking device, and/or a combined locate and marking device. Depending on the nature of the assessment, it may be performed substantially in real time with respect to the generation of field information/data used in connection with the assessment (e.g., one or more of locate information, marking information and landmark information contained in electronic records of a locate and marking operation and/or an electronic manifest of same), otherwise during a locate and/or marking operation, or after completion of a locate and/or marking operation.

In some embodiments described herein, a notification may be generated based on the quality assessment performed. The notification may provide one or more indications of the quality of the locate and marking operation as a whole, or of some aspect thereof. For example, the notification may provide an indication of a degree of correspondence or discrepancy between field data contained in the electronic record of the locate and marking operation and reference data contained in the reference electronic record to which it is compared. Likewise, the notification may provide an indication that the locate and marking operation is or is not approved based on the comparison of the field data to the reference data. The notification may be transmitted electronically or otherwise conveyed, for example, to one or more parties associated with one or more underground facilities within the dig area or in a geographic area proximate to or surrounding and subsuming the work site, one or more parties associated with the performance or oversight of the locate and marking operation, and/or one or more parties associated with excavation of the dig area, for example.

In exemplary embodiments in which the reference information comprises data relating to one or more environmental landmarks ("landmark information," e.g., geographic information and/or landmark category/type information relating to one or more environmental landmarks), a variety of assessments are possible.

For example, in a first embodiment relating to environmental landmarks, field information including geographic information, facility type information, and/or other information relating to an underground facility identified and/or marked during a locate and/or marking operation may be compared to reference information comprising landmark information to determine whether or not the location and/or type of one or more facilities identified and/or marked during the locate and/or marking operation are expected in view of the location and/or type of one or more environmental landmarks. Such a comparison may include identifying at least one correspondence or discrepancy between the compared data based on or more criteria. The landmark information may be derived, for example, from one or more facilities maps, one or more historical tickets, or may be collected together with (e.g., essentially concurrently with) various information relating to the locate and/or marking operation (the locate and/or marking operation to be assessed may include acquisition of landmark information relating to one or more environmental landmarks, and this landmark information may be used for the assessment).

In a second exemplary embodiment relating to environmental landmarks, "new" landmark information collected as part of a current/recent locate and/or marking operation (e.g., via a suitably configured marking device, locate device, or combined locate and marking device, and/or indicated on an electronic manifest for the locate and/or marking operation) may be compared to "reference" landmark information. The reference landmark information may be derived, for example, from one or more facilities maps or one or more historical tickets (which themselves may include previous electronic manifests), and such a comparison may serve as a basis for assessment. In one aspect of this embodiment, both "new"

landmark information and other information relating to the locate and/or marking operation (e.g., geographic information, facility type information, etc.) may be compared to the reference landmark information and other facility-related information derived from one or more facilities maps or one or more historical tickets, such that an assessment is based both on a comparison of environmental landmarks and facilities.

In yet other embodiments, a first electronic representation of field information relating to a locate and marking operation (e.g., data in an electronic record, an electronic manifest, etc.), as well as a second electronic representation of reference information (e.g., data in a reference electronic record from any of a variety of sources) to which the first electronic representation is compared, may be visually rendered (e.g., via a computer-generated visual representation in a display field) such that the electronic representations are overlaid to provide a visual aid to an automated assessment process.

In sum, one embodiment of the present invention is directed to a method, performed in a computer comprising at least one hardware processor, at least one tangible storage medium, and at least one input/output (I/O) interface, for evaluating a quality of a locate and/or marking operation to identify a presence or an absence of at least one underground facility at a work site. The method comprises: A) comparing first information relating to the locate and/or marking operation to second information relating to a presence or an absence of one or more reference environmental landmarks; B) automatically generating, based on A), at least one indication of a quality assessment of the locate and/or marking operation; and C) electronically storing on the at least one tangible storage medium, and/or electronically transmitting via the at least one I/O interface, the at least one indication of the quality assessment so as to provide an electronic record of the quality assessment.

Another embodiment is directed to an apparatus for evaluating a quality of a locate and/or marking operation to identify a presence or an absence of at least one underground facility at a work site. The apparatus comprises: at least one input/output (I/O) interface; at least one memory storing processor-executable instructions; and a processor coupled to the memory and the at least one I/O interface. Upon execution of the processor-executable instructions by the processor, the processor: A) compares first information relating to the locate and/or marking operation to second information relating to a presence or an absence of one or more reference environmental landmarks; B) automatically generates, based on A), at least one indication of a quality assessment of the locate and/or marking operation; and C) controls the at least one memory so as to electronically store, and/or controls the at least one I/O interface so as to electronically transmit, the at least one indication of the quality assessment so as to provide an electronic record of the quality assessment.

Another embodiment is directed to at least one computer-readable storage medium encoded with instructions that, when executed by a processor in a computer comprising at least one input/output (I/O) interface, perform a method for evaluating a quality of a locate and/or marking operation to identify a presence or an absence of at least one underground facility within a work site. The method comprise: A) comparing first information relating to the locate and/or marking operation to second information relating to a presence or an absence of one or more reference environmental landmarks; B) automatically generating, based on A), at least one indication of a quality assessment of the locate and marking operation; and C) electronically storing on the at least one computer-readable storage medium, and/or electronically transmitting via the at least one I/O interface, the at least one indication of the quality assessment so as to provide an electronic record of the quality assessment.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device, used alone or in combination with any other device, for detecting and/or inferring the presence or absence of any facility, including without limitation, any underground facility. In various examples, a locate device often includes both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The term "complex event processing (CEP)" refers to a software and/or hardware-implemented (e.g., facilitated by a computer system, distributed computer system, computational analysis coded in software, and/or a combination thereof) technique relating to recognizing one or more events, patterns of events, or the absence of an event or pattern of events, within one or more input streams of information and performing one or more actions and/or computations in response to such recognition, in accordance with specified rules, criteria, algorithms, or logic. CEP generally involves detection of relationships between information contained in input streams (which input streams may include indications of previously recognized events), such as causality, membership, timing, event-driven processes, detection of complex patterns of one or more events, event streams processing, event correlation and abstraction, and/or event hierarchies. CEP may complement and contribute to technologies such as, but not limited to, service oriented architecture (SOA), event driven architecture (EDA), and/or business process management (BPM). CEP allows the information contained in the events flowing through all of the layers of a service business, an enterprise information technology infrastructure and/or management operation to be discovered, analyzed, and understood in terms of its impact on management goals and business processes, and acted upon in real time or as a management process.

The following U.S. published applications are hereby incorporated herein by reference:

U.S. publication no. 2008-0228294-A1, published Sep. 18, 2008, filed Mar. 13, 2007, and entitled "Marking System and Method With Location and/or Time Tracking;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0202112-A1, published Aug. 13, 2009, filed Feb. 11, 2009, and entitled "Searchable Electronic Records of Underground Facility Locate Marking Operations;" and U.S. publication no. 2009-0204614-A1, published Aug. 13, 2009, filed Feb. 11, 2009, and entitled "Searchable Electronic Records of Underground Facility Locate Marking Operations."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

FIG. 6 illustrates a data set that may be associated with an electronic manifest and from information may be obtained for a quality assessment, in accordance with some embodiments of the present disclosure;

DETAILED DESCRIPTION

Figure 1:
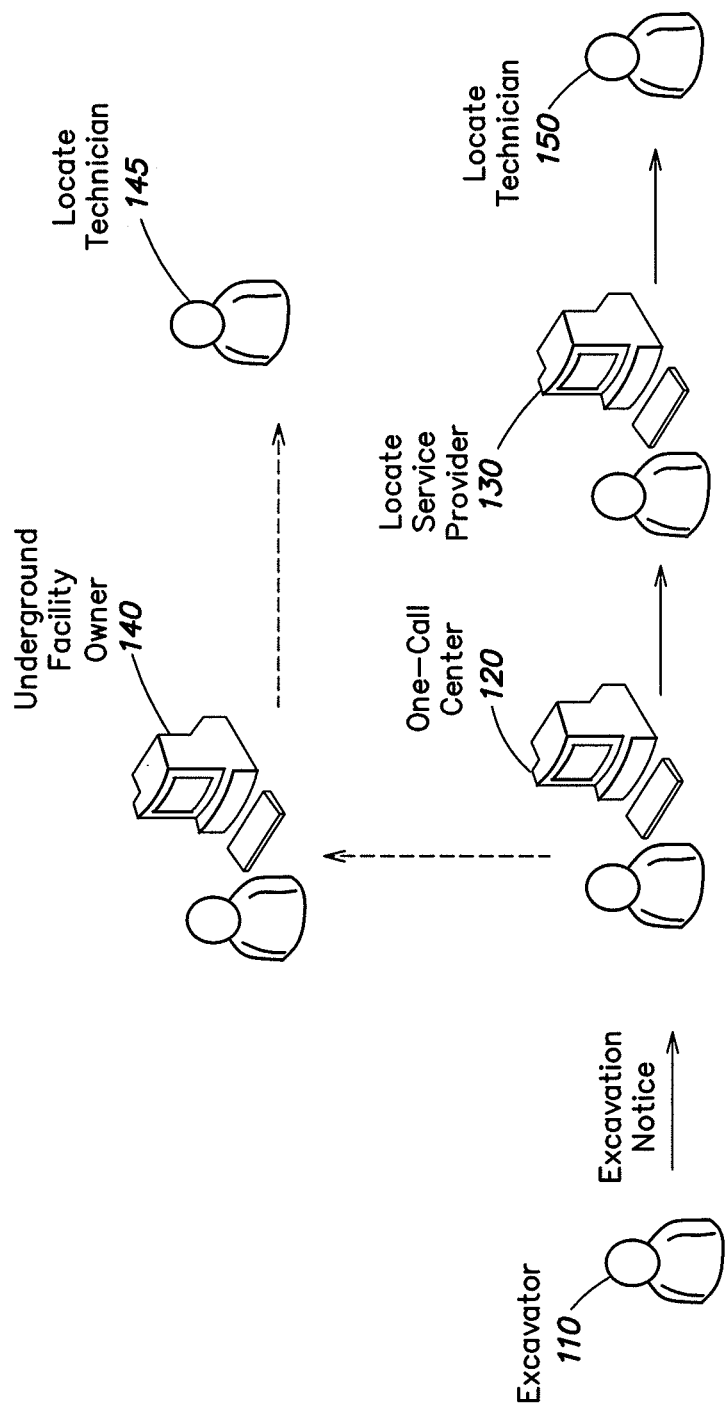
FIG. 1 shows an example in which a locate and marking operation is initiated as a result of an excavator providing an excavation notice to a one-call center.

Following below are more detailed descriptions of various concepts related to, and embodiments of, inventive systems, methods and apparatus for analyzing locate and marking operations with respect to environmental landmarks. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. Overview

Various inventive embodiments disclosed herein relate to methods, apparatus and systems for performing oversight and quality control in field service operations, such as locate and marking operations. In general, approvers and/or managers may review the quality of these locate and marking operations in real time and/or within a certain amount of time (e.g., within one day) of completion of the operation. The review of a locate and marking operation by a human (e.g., an approver or manager) and the determination of a quality assessment for the operation based solely on the discretion of the human is referred to herein as a "manual quality assessment."

Some embodiments described herein are related to methods, apparatus and systems for at least partially automating oversight and quality assessment in underground facility locate operations and/or other field service operations. For example, in some embodiments, an automated quality assessment system may receive "field information" (also referred to as "field data") related to a locate and marking operation from one or more sources of electronic data (e.g., electronic records of locate and marking operations generated by various locate equipment, an electronic manifest for same, ticket information, service-related information, etc.), electronically analyze the contents of the field information/data by comparing it to "reference information" (also referred to as "reference data") relating to one or more environmental landmarks (also referred to herein as "landmark information"), and automatically assess the quality of the operation based at least in part on the analysis (e.g., according to predetermined criteria on which the comparison is based and metrics for the criteria).

In other embodiments, automated analysis of field information/data facilitates further analysis and/or quality assessment by a human, in which the quality assessment is not based solely on the discretion of the human, but is significantly informed in some manner by automated analysis of data. As contrasted with the above-discussed "manual quality assessment" of a locate and marking operation by a human, this type of assessment (e.g., based on some degree of electronic analysis of data relating to a locate and/or marking operation) is referred to herein as "automated quality assessment."

In some embodiments, methods, apparatus and systems according to the present invention may automatically output one or more of a variety of indications of the assessed quality of a locate operation. In one aspect, the indication of the assessed quality of a locate operation may be a categorized into one or more of a plurality of quality categories. Any suitable number and type of categories may be used, as the invention is not limited in this respect. For example, in some embodiments, a locate operation may be automatically categorized as either, (a) approved—no further action needed; (b) satisfactory, but the locate technician needs coaching or training; (c) unsatisfactory—the ticket needs quality control (QC) action; or (d) real-time prompt—an aspect of the assessment may be suitable for prompting the locate technician in real time with respect to, for example, performing an immediate verification and/or corrective action. In other implementations, a score, grade, or other graduated indication (e.g., based on some maximum range or scale) may be provided as an indication of quality assessment in connection with a locate and marking operation.

II. Automated Quality Assessment

Figure 2:
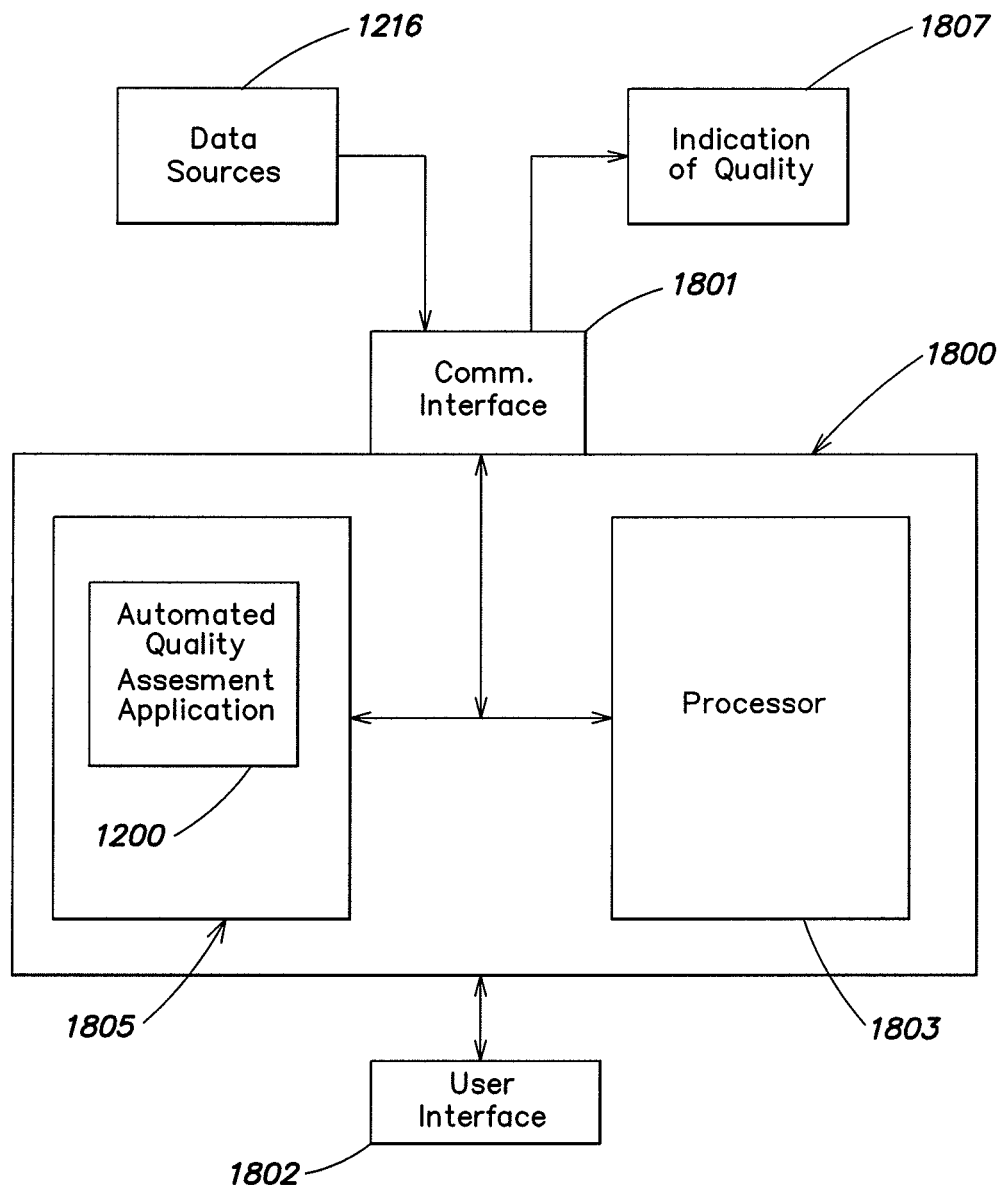
FIG. 2 illustrates a block diagram of an automated quality assessment system for assessing the quality of a field service operation, in accordance with some embodiments of the present disclosure.

FIG. 2 is a block diagram of an automated quality assessment system 1800. Automated quality assessment system 1800 may be, for example, a computer system having at least one hardware processor 1803, a memory 1805 that comprises at least one tangible storage medium (e.g., RAM, ROM, Flash memory, one or more magnetic storage devices, one or more optical storage devices, or any other type of tangible storage medium), and at least one communications interface 1801. Memory 1805 may store computer-readable (processor-executable) instructions of an automated quality assessment application 1200, which may be executed by processor 1803. When executed by processor 1803, automated quality assessment application 1200 may obtain information associated with a field service operation (e.g., a locate and marking operation) from data sources 1216 via communication interface 1801, analyze the data to assess the quality of the field service operation and may output (e.g., via communication interface 1801) one or more indications of the quality assessment of the field service operation. In some implementations, one or more indications of the quality assessment may be stored in the memory and/or transmitted via the communication interface to provide an electronic record of the quality assessment. The communication interface 1801 may be coupled to a wired or wireless network, bus, or other communication means and may therefore allow the system 1800 to transmit communications to and/or receive communications from other devices.

The computer system of FIG. 2 serving as an automated quality assessment system 1800 may further comprise one or more user interfaces 1802, which may include one or more display units (not shown) The display unit(s) may be provided, for example, to allow a user to view various information in connection with execution of the instructions and/or the indication(s) of quality assessment. In general, the user interface allows a user to communicate with the processor 1803, make manual adjustments, make selections, enter data or various other information, receive information, and/or interact in any of a variety of manners with the processor during execution of the instructions.

Figure 3:
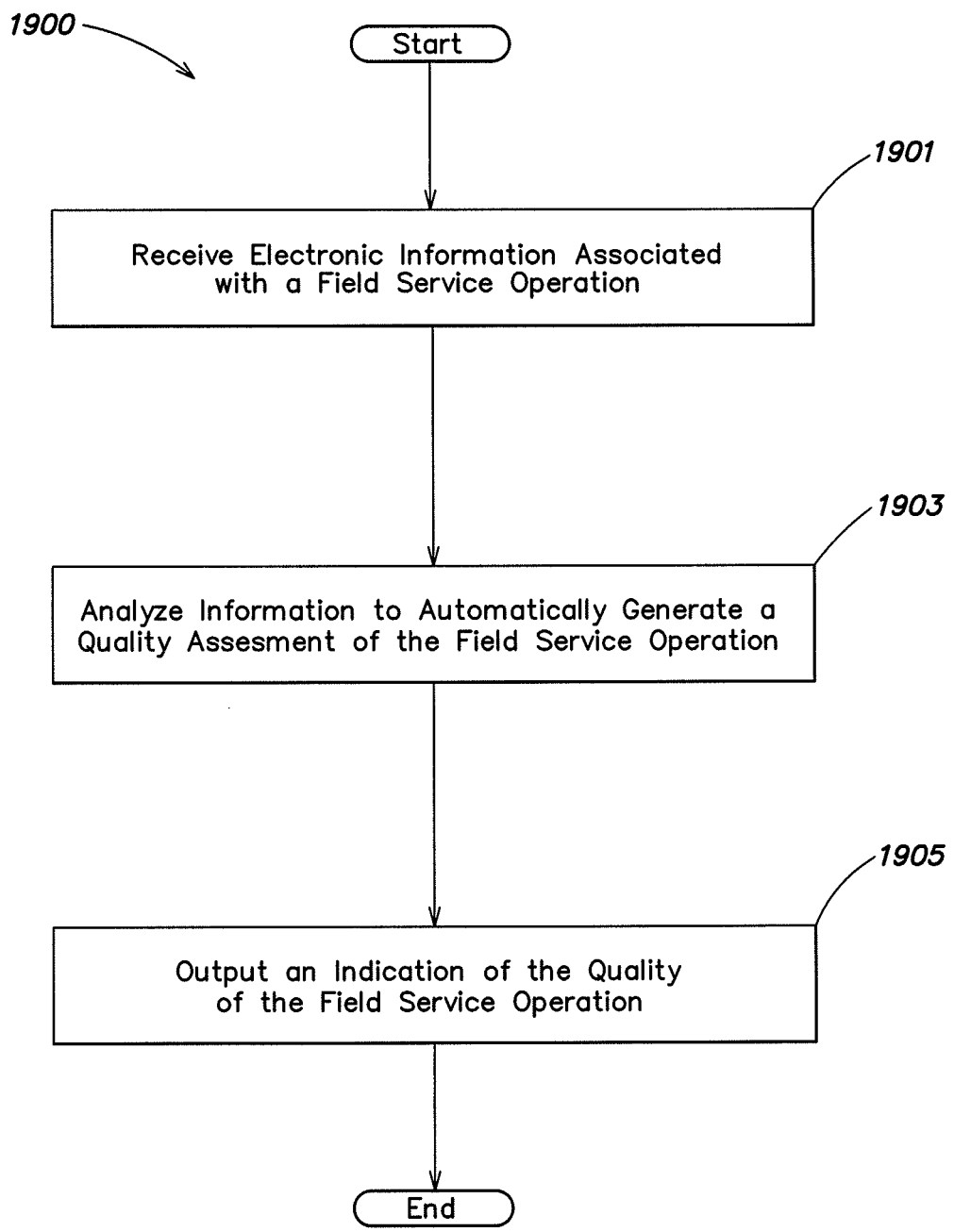
FIG. 3 illustrates a flow diagram of an example of a process for automatically assessing the quality of a field service operation, in accordance with some embodiments of the present disclosure.

FIG. 3 is a flow chart of process 1900 that may be performed by quality assessment application 1200 to automatically assess the quality of a field service operation, such as, for example, a locate and marking operation. Process 1900 begins at act 1901, where the automated quality assessment application receives electronic information associated with a field service operation. The process next continues to act 1903, where the automated quality assessment application analyzes at least some of the received information to automatically generate a quality assessment of the field service operation. The process next continues to act 1905, where the automated quality assessment application outputs an indication of the quality of the field service operation that is based on the assessment generated in the act 1903.

Figure 4:
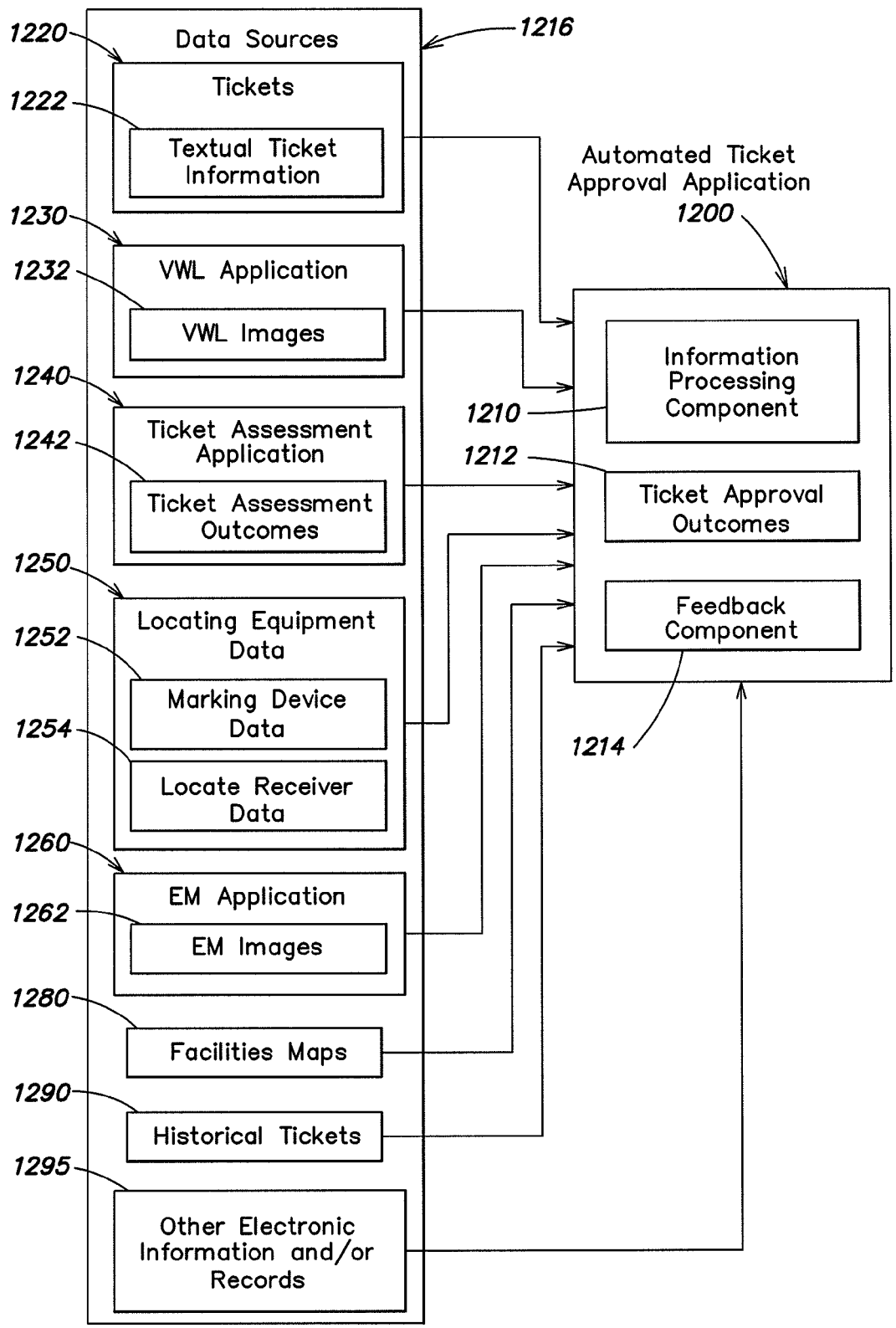
FIG. 4 illustrates a functional block diagram of an example of an automated quality assessment application for automatically performing quality control in underground facility locate applications, in accordance with some embodiments of the present disclosure.

Referring to FIG. 4, a more detailed block diagram of automated quality assessment application 1200 and data sources 1216 is presented. Automated quality assessment application 1200 may be, for example, a rules-based computer software application that includes, for example, an information processing component 1210, quality assessment outcomes 1212 (e.g., one or more indications of the quality assessment), and a feedback component 1214. Automated quality assessment application 1200 may be fed by any number of data sources 1216, which may include various types of electronic information and/or records of data associated with locate and/or marking operations performed in the field (e.g., both "field information/data" and "reference information/data").

For example, the automated quality assessment application 1200 of the present disclosure may automatically review a variety of field information, which may include "closed" or completed tickets (i.e., tickets pursuant to which a locate and/or marking operation has been performed) and their associated manifests (which may or may not include digital images relating to the locate operation), and/or any information relating thereto, in essentially real time and/or within a specified amount of time, such as within one day, from the ticket being closed. In some embodiments discussed in further detail below, closed tickets may be reviewed by automatically interrogating received data associated with a locate and marking operation against various metrics, such as reference information/data derived from or relating to one or more environmental landmarks.

In some embodiments, information processing component 1210 of automated quality assessment application 1200 may be, for example, a rules-based software component for analyzing the contents of any information that is available in data sources 1216 and then automatically performing an assessment with respect to the quality of a locate operation that is performed in the field. For each locate and marking operation that is assessed, information processing component 1210 may automatically generate a quality assessment outcome 1212 that corresponds to the results of the automatic quality assessment.

Any suitable type of outcome may be generated. For example, in some embodiments, the outcome generated may be a categorization of the locate operation into one of a plurality of quality categories (also referred to herein as "scoring" categories or "grading" categories). For example, based on the automatic quality assessment, a locate operation may be categorized as:

APPROVED—the locate operation is approved, no further action needed;

SATISFACTORY—the locate operation is approved, but the locate technician needs coaching or training;

UNSATISFACTORY—the locate operation is not approved, the ticket needs QC action; or PROMPT—an aspect of the locate operation assessment may be suitable for transmitting a real-time prompt to the locate technician with respect to, for example, performing a substantially immediate verification and/or corrective action.

Other examples of possible outcomes generated by automated ticket application 1200 include, but are not limited to, a numerical score (e.g., a score of 0-100%), a grade (e.g., a grade of A-F), or other graduated indicator, based on some range, scale and/or resolution (granularity), that is indicative of the quality of the assessed locate operation.

Feedback component 1214 of automated quality assessment application 1200 generates the real-time prompts. For example, once the nature of the real-time prompt is determined, feedback component 1214 queries the ticket information in order to ensure that the prompt is directed to the proper originating locate technician. Additional details of the operation of automated quality assessment application 1200 are described with reference to the method of FIG. 6.

III. Exemplary Data Sources for Information Relating to Environmental Landmarks Examples of data sources 1216 that may be processed by information processing component 1210 of automated quality assessment application 100 may include, but are not limited to, one or more tickets 1220, a virtual white lines (VWL) application 1230, a ticket assessment application 1240, locating equipment data 1250, an electronic manifest (EM) application 1260, one or more facilities maps 1280, an archive of historical tickets 1290, and any other electronic information and/or records 1295. In implementation, the various data sources 1216 may be supplied by multiple entities (not shown) and accessible to automated quality assessment application 1200 via, for example, a networked computing system for supporting locate operations.

In various embodiments of automated quality assessment based on information/data derived from the data sources 1216, it should be appreciated that some of this information/data may be treated as "field information/data" and some of this information/data may be treated as "reference information/data" to which the field information/data is compared during the assessment process. Additionally, it should be appreciated that some of the information/data available from the data sources 1216 may be used to "pre-process" or filter one or both of the field information/data and the reference information/data prior to comparison for some types of assessments.

A. Tickets

Tickets 1220 of data sources 1216 are locate request tickets that may be submitted by excavators and processed by one-call centers. Tickets 1220 may include textual ticket information 1222 that comprises instructions with respect to performing a locate operation, such as, but not limited to, a ticket and/or work order number, date information, geographic location information (e.g., address information), excavation information, excavator information, site information (e.g., a description of the dig area, which may include a description of one or more environmental landmarks in or near the dig area/work site), locate operations instructions information, caller information, remarks information, task information, and any combinations thereof.

Historical tickets 1290 of data sources 1216 may include any records of prior locate and/or marking operations performed pursuant to previous locate request tickets. These historical records may relate in some instances, but not necessarily, to locate and/or marking operations performed in the past for the same work site/dig area specified in the present ticket 1220 subject to quality assessment. In the process of performing the automatic quality assessment of a present ticket 1220, information processing component 1210 may aggregate the information that is contained in one or more historical tickets 1290 (which in some cases may relate to the same work site/dig area) in order to determine the facilities that have been located and/or marked during past locate operations at that site, and/or the presence of one or more environmental landmarks. Some of the information types discussed in further detail below may form part of a historical ticket and may be derived from records associated with such tickets for purposes of an assessment. For example, records associated with historical tickets may include digital images having one or more of dig area indicators, electronic locate marks and symbols or icons for environmental landmarks overlaid thereon; additionally, or alternatively, such records may include a variety of data provided by one or more pieces of locating equipment used to perform the locate and/or marking operation (see sections B, C, and D below).

B. Dig Area Indicators and Associated Information

VWL application 1230 of data sources 1216 is a computer software application that provides an electronic drawing tool that may be used by excavators for electronically marking up, for example, a digital aerial image of the dig area. In this manner, instead of (or in addition to) physically visiting the site of the dig area and marking white lines on the ground at that site, an excavator may electronically draw markings (e.g., white lines) on an aerial image of the site, indicating where digging is planned. These marked up digital images may be saved as, for example, VWL images 1232, which may include accompanied with metadata pertaining to various information in the images. One or more VWL images 1232 in turn may be associated with, for example, tickets 1220 and transmitted to locate companies.

VWL application 1230 may be implemented, for example, as described in U.S. patent application Ser. No. 12/366,853 filed Feb. 6, 2009, entitled "Virtual white lines for delimiting planned excavation sites;" U.S. patent application Ser. No. 12/475,905 filed Jun. 1, 2009, entitled "Virtual white lines for delimiting planned excavation sites of staged excavation projects;" U.S. patent application Ser. No. 12/422,364 filed Apr. 13, 2009, entitled "Virtual white lines (VWL) application for indicating a planned excavation or locate path." Each of these patent applications is hereby incorporated by reference herein in its entirety.

In one example, the dig area indicators in a VWL image may include two-dimensional (2D) drawing shapes, shades, points, symbols, coordinates, data sets, or other indicators to indicate on a digital image the dig area in which excavation is to occur. To generate the electronic image having dig area indicators, an image (e.g., an aerial image) of the work site may be sent to an excavator via a network, the excavator may use a computing device executing the VWL application 1230 to create a VWL image by marking up the image to include one or more dig area indicators precisely delimiting one or more dig areas within the work site and, in response, the marked-up VWL image may be received from the excavator via the network.

As noted above, a VWL image 1232 may include metadata corresponding to any markings or content in the image; in particular, geographic information including geographic coordinates (e.g., latitude and longitude values) for any dig area indicators marked on the image may accompany or be included in an image file as metadata, and these geographic coordinates may be employed in some manner as part of a quality assessment process. For example, as discussed further below, in one embodiment geographic information derived from a virtual white lines (VWL) application 1230 (e.g., geographic coordinates associated with one or more dig area indicators contained in a VLW image 1232) may be used by automated quality assessment application 1200 to filter or limit the contents of either field data or reference data prior to analysis/comparison.

In particular, in one exemplary implementation, geographic coordinates associated with a dig area indicator may be used to select contents that relates only to a geographic area including the geographic coordinates for the dig area indicator, or contents that falls within a predetermined radius of the geographic coordinates for the dig area indicator or a polygon-shaped buffer zone around the geographic coordinates for the dig area indicator. In yet another example, geographic coordinates associated with a dig area indicator may be used to filter out some contents that does not relate to a specifically delimited dig area within a work site as defined by the VWL application (e.g., first geographic information or another portion of information may be selected from the field data, and/or second geographic information or another portion of information may be selected from the reference data, that relates only to a geographic area delimited by the VWL geographic information). Accordingly, it should be appreciated that in some embodiments, the dig area indicator coordinates may identify a plurality of points along a perimeter of the delimited dig area, and these coordinates may be used to select specific geographic information (e.g., filter out geographic information outside of the delimited dig area). In other embodiments, the dig area indicator coordinates may identify a single point, in which case the coordinates may be used to select particular information based at least in part on the coordinates for the single point.

C. Locating Equipment Data

With respect to locating equipment data 1250, as noted above, a locate technician may use locating equipment, such as a locate instrument set (including a locate receiver device), a marking device, or a combined locate and marking device, so as to perform a locate and marking operation. Locating equipment data 1250 of data sources 1216 may be any information that is collected and/or generated (e.g., one or more electronic records) by any type of locating equipment equipped with components that are capable of collecting electronic information and/or creating electronic records about locate and marking operations that are performed in the field. In some examples, locating equipment data 1250 is constituted by "marking information" or marking device data 1252 that is associated generally with the marking functionality of a locate and marking operation, and/or "locate information" or locate receiver data 1254 that is associated generally with the locating/detection functionality of a locate and marking operation. Locating equipment data 1250 also may include "landmark information" that may be acquired by suitably configured locating equipment (e.g., a marking device, a locate device, or a combined locate and marking device capable of operating in a "landmark mode"), which information may be acquired either independently or as part of (e.g., during or proximate in time to) a locate and marking operation.

In one example, marking device data 1252 of locating equipment data 1250 may be electronic information and/or one or more electronic records of data that is provided by electronic marking devices and/or marking systems. Examples of electronic marking devices and/or marking systems that may provide marking device data 1252 may include, but are not limited to, those described in reference to U.S. patent application Ser. No. 11/696,606, filed Apr. 4, 2007 and published Oct. 9, 2008, entitled "Marking system and method;" U.S. patent application Ser. No. 11/685,602, filed Mar. 13, 2007 and published Sep. 18, 2008, entitled "Marking system and method;" U.S. Non-provisional application Ser. No. 12/568,087, filed on September 28, entitled "Methods and Apparatus for Generating an Electronic Record of Environmental Landmarks Based on Marking Device Actuations;" U.S. Non-provisional application Ser. No. 12/539, 497, filed on Aug. 11, 2009, entitled "Methods and Apparatus for Generating an Electronic Record of a Marking Operation based on Marking Device Actuations;" U.S. Provisional Patent Application Ser. No. 61/102,151 filed Oct. 2, 2008, entitled "Data acquisition system for and methods of analyzing locate activities based on marking device actuations;" and U.S. Provisional Patent Application Ser. No. 61/151,574 filed Feb. 11, 2009, entitled "Marking device that has enhanced features for underground facility locate applications." Each of these applications is incorporated herein by reference in its entirety.

Table 1 shows one example of a sample of marking device data 1252 of locating equipment data 1250 that may be captured as the result of, for example, an actuation of a marking device. In some exemplary implementations, an electronic record of a marking operation may include multiple data entries as shown in the example of Table 1 for respective actuations of a marking device to dispense a marking material (e.g., in some cases there may be one set of data as shown in Table 1 for each actuation). In this manner, each time a marker is dispensed (so as to indicate a presence or absence of a given underground facility), data is collected relating to the geographic location of the dispensed marker (e.g., geo-location data). Additionally, data relating to a characteristic of the dispensed marker (e.g., color and/or brand) is included in the data entries of the electronic record, as well as other data germane to the marking operation.

TABLE 1

| Example marking device data 1252 of locating equipment data 1250 | |
|---|---|
| Service provider ID | 0482 |
| Locate technician ID | 4815 |
| Marking Device ID | 7362 |
| Timestamp data | 12-Jul-2008; 09:35:15.2 |
| Geo-location data | N35°43.57518, W078°49.78314 (deg. and dec. min.) |
| Marking material data | Color = Red, Brand = ABC |
| Temperature data | 73 degrees F. |
| Humidity data | 30% |
| Light data | 4.3 volts |
| Compass data | 213 degrees |
| Inclinometer data | −40 |
| Accelerometer data | 0.275 g |
| Battery strength data | 73% |

Table 2 below shows another example of marking device data 1252 of locating equipment data 1250 that may be captured as the result of, for example, one or more actuations of a marking device. Specifically, Table 2 illustrates multiple "actuation data sets" of an electronic record of a marking operation as generated by a marking device, in which each actuation data set includes information associated with multiple actuation event entries logged during a corresponding actuation and dispensing of a locate mark. Table 2 shows three actuation data sets of an electronic record, corresponding to three actuations of the marking device (e.g., act-1, act-2, and act-3). As may be appreciated from the information shown in Table 2, multiple pieces of geo-location data are logged for each actuation of a marking device (in addition to various other information).

TABLE 2

Example actuation data set for act-1

| act-1 | Service provider ID | 0482 |
|---|---|---|
| | User ID | 4815 |
| | Device ID | 7362 |
| | T1 timestamp data | 12-Jul-2008; 09:35:15.2 |
| | T2 timestamp data | 12-Jul-2008; 09:35:16.1 |
| | Duration ($\Delta t$) | 00:00:00.9 |
| | T1 geo-location data | 2650.9348, N, 08003.5057, W |
| | $1^{st}$ interval location data | 2650.9353, N, 08003.5055, W |
| | $2^{nd}$ interval location data | 2650.9356, N, 08003.5055, W |
| | . | . |
| | . | . |
| | . | . |
| | Nth interval location data | 2650.9246, N, 08003.5240, W |
| | T2 geo-location data | 2650.9255, N, 08003.5236, W |
| | Product data | Color = Red, Brand = ABC, Type/Batch = 224B-1 |
| | Locate request data | Requestor: XYZ Construction Company, Requested service address: 222 Main St, Orlando, FL |

Example actuation data set for act-2

| act-2 | Service provider ID | 0482 |
|---|---|---|
| | User ID | 4815 |
| | Device ID | 7362 |
| | T1 timestamp data | 12-Jul-2008; 09:35:17.5 |
| | T2 timestamp data | 12-Jul-2008; 09:35:18.7 |
| | Duration ($\Delta t$) | 00:00:01.2 |
| | T1 geo-location data | 2650.9256, N, 08003.5234, W |
| | 1st interval location data | 2650.9256, N, 08003.5226, W |
| | $2^{nd}$ interval location data | 2650.9256, N, 08003.5217, W |
| | . | . |
| | . | . |
| | . | . |
| | Nth interval location data | 2650.9260, N, 08003.5199, W |
| | T2 geo-location data | 2650.9266, N, 08003.5196, W |
| | Product data | Color = Red, Brand = ABC, Type/Batch = 224B-1 |
| | Locate request data | Requestor: XYZ Construction Company, Requested service address: 222 Main St, Orlando, FL |

Example actuation data set for act-3

| act-3 | Service provider ID | 0482 |
|---|---|---|
| | User ID | 4815 |
| | Device ID | 7362 |
| | T1 timestamp data | 12-Jul-2008; 09:35:18.7 |
| | T2 timestamp data | 12-Jul-2008; 09:35:19.8 |
| | duration ($\Delta t$) | 00:00:01.1 |
| | T1 geo-location data | 2650.9273, N, 08003.5193, W |
| | 1st interval location data | 2650.9281, N, 08003.5190, W |
| | $2^{nd}$ interval location data | 2650.9288, N, 08003.5188, W |
| | . | . |
| | . | . |
| | . | . |
| | Nth interval location data | 2650.9321, N, 08003.5177, W |
| | T2 geo-location data | 2650.9325, N, 08003.5176, W |
| | Product data | Color = Red, Brand = ABC, Type/Batch = 224B-1 |
| | Locate request data | Requestor: XYZ Construction Company, Requested service address: 222 Main St, Orlando, FL |

With regard to the marking material color information that may be included in marking device data 1252 as exemplified in Tables 1 and 2, Table 3 shows an example of the correlation of marking material color to the type of facility to be marked.

TABLE 3

Correlation of color to facility type

| Marking material color | Facility Type |
|---|---|
| White | Proposed excavation |
| Pink | Temporary survey markings |
| Red | Electric power lines, cables or conduits, and lighting cables |
| Yellow | Gas, oil, steam, petroleum, or other hazardous liquid or gaseous materials |
| Orange | Communications, cable TV, alarm or signal lines, cables, or conduits |
| Blue | Water, irrigation, and slurry lines |
| Purple | Reclaimed water, irrigation and slurry lines |
| Green | Sewers, storm sewer facilities, or other drain lines |
| Black | Mark-out for errant lines |

In another example, locate receiver data 1254 of locating equipment data 1250 may be electronic information (e.g., one or more electronic records) of data that is provided by electronic locate receiver devices and/or systems. Examples of a locate receiver device that may provide locate receiver data 1254 are described in U.S. Non-provisional application Ser. No. 12/569,192, filed on Sep. 29, 2009, entitled "Methods, Apparatus, and Systems for Generating Electronic Records of Locate and Marking Operations, and Combined Locate and Marking Apparatus for Same;" U.S. Provisional Patent Application Ser. No. 61/151,578, entitled "Locating equipment that has enhanced features for increased automation in underground facility locate applications;" and U.S. Provisional Patent Application Ser. No. 61/102,122, filed on Oct. 2, 2008, entitled "Combination Locate and Marking Device With a Data Acquisition System Installed Therein, and Associated Methods," which applications are both hereby incorporated herein by reference in their entirety.

Table 4 below shows an example of a sample of locate receiver data 1254 of locating equipment data 1250 that may be captured, for example, at one or more times during operation/use of an appropriately configured locate receiver. Different models of locate receivers and transmitters are available from a variety of manufacturers and have different features; accordingly, it should be appreciated that the information content and type provided in Table 4 is exemplary of possible information relating to locate receivers on which a quality assessment of a locate operation may be based, and that other types and values for information are possible. With respect to information potentially provided by a given locate receiver as shown in Table 4 below, the "gain" is typically a measure of the degree of sensitivity of a locate receiver antenna that is picking up a signal emanating from along an underground facility (alternatively, "gain" may be viewed as a degree of amplification being applied to a received signal). Gain may be expressed in terms of any scale (e.g., 0-100), as a numeric value or percentage. "Signal strength" refers to the strength of a received signal at a given gain value; signal strength similarly may be expressed in terms of any scale, as a numeric value or percentage. Generally speaking, higher signal strengths at lower gains typically indicate more reliable information from a locate receiver, but this may not necessarily be the case for all locate operations.

In some exemplary implementations, an electronic record of a locate operation as obtained from a locate receiver may include multiple data entries as shown in the example of Table 4. Each such entry may not only include information about various operating parameters of the locate receiver (e.g., signal strength, gain), but may additionally include location information (geo-location data) associated with detected facilities, as well as various environmental data. The logging of a given entry by a locate receiver may automatically result from one or more conditions (e.g., signal strength exceeding a particular threshold) and/or respective data entries may be manually logged by a technician using the locate receiver (e.g., via a push button, touch screen, trigger actuation, or other interaction facilitated by a user interface of the locate receiver). In this manner, multiple pieces of data may be collected for an electronic record of a locate operation, including multiple pieces of geo-location data for a given underground facility detected via the locate receiver.

TABLE 4

Example locate receiver data 1254 of locating equipment data 1250

| | |
|---|---|
| Service provider ID | 0482 |
| Locate technician ID | 4815 |
| Locate Device ID | 7345 |
| Timestamp data | 12-Jul-2008; 09:35:15.2 |
| Geo-location data | N35°43.57518, W078°49.78314 (deg. and dec. min.) |
| Locate mode | Mode = PASSIVE |
| Gain | 35 (on a scale of 1-100) |
| Sig. strength | 85% (on a scale of 0-100%) |
| Signal frequency | 60 Hz |
| Facility depth | 3.4 feet |
| Temperature data | 73 degrees F. |
| Humidity data | 30% |
| Light data | 4.3 volts |
| Compass data | 213 degrees |
| Inclinometer data | −40 |
| Accelerometer data | 0.275 g |
| Battery strength data | 85% |

In another example, both marking device data 1252 and locate receiver data 1254 of locating equipment data 1250 may be electronic information (e.g., one or more electronic records) of data that is provided by a combined locate and marking device. An example of such a combined locate and marking device is described in U.S. Non-provisional application Ser. No. 12/569,192, filed on Sep. 29, 2009, entitled "Methods, Apparatus, and Systems for Generating Electronic Records of Locate and Marking Operations, and Combined Locate and Marking Apparatus for Same," and U.S. Provisional Patent Application Ser. No. 61/102,122, filed on Oct. 2, 2008, entitled "Combination Locate and Marking Device With a Data Acquisition System Installed Therein, and Associated Methods," which applications are both hereby incorporated herein by reference in their entirety.

Table 5 below illustrates one non-limiting example of four actuation data sets that may be collected in an electronic record generated by a combined locate and marking device, in which each data set corresponds, for example, to a separate actuation event to dispense marking material. It should be appreciated, however, that these are merely examples, and that various alternative electronic records may be generated according to the aspects of the invention, for example reflecting different types of information associated with operation of a combination locate and marking device.

Each of the four records of Table 5 includes general information not limited to either the locate receiver functionality or marking functionality of the combination device, such as an identification of the service provider (Service provided ID), an identification of the user (User ID), an identification of the device (Device ID), and information about the requestor of the locate operation and the requested address (Locate request data). In addition, an entry describing the mode of data collection (e.g., Manual) for the device is also collected, which may indicate that information is logged into the record(s) upon actuation of the combined locate and marking device. Information about the actuation itself, such as the time of actuation (Timestamp data), actuation duration, and geographical location (geo-location data) at the start, during, and/or at and end of the actuation may also be included. The data sets also include information relating to the locate receiver functionality of the combination locate and marking device, including the receiver detection mode (i.e., PEAK in Table 5), the strength of a detected signal, and the frequency of the detected signal. Information relating to a depth measurement (Facility depth) is also included, as is information about the marking material to be dispensed by the combination locate and marking device. Again, it should be appreciated that Table 5 is an illustration of one electronic record including multiple data sets that may be generated in association with operation of a combination locate and marking device, and that other forms of electronic records are also possible.

TABLE 5

Electronic Record for Combination Locate and Marking Device

| | | |
|---|---|---|
| Record #1001 | Service provider ID | 0482 |
| | User ID | 4815 |
| | Device ID | 7362 |
| | Device mode | Mode = MANUAL |
| | Timestamp data | 12-Jul-2008; 09:35:15 |
| | Actuation duration | 0.5 sec |
| | Start actuation location data | 2650.9348, N, 08003.5057, W |
| | End actuation location data | 2650.9353, N, 08003.5055, W |
| | Locate mode | Mode = PEAK |
| | Signal strength (% of maximum) | 85% |
| | Signal frequency | 1 kHz |
| | Facility depth | 3.4 meters |
| | Marking material data | Color = RED, Brand = ABC |
| | Locate request data | Requestor = XYZ Construction Company, Requested service address = 222 Main St, Orlando, FL |
| Record #1002 | Service provider ID | 0482 |
| | User ID | 4815 |
| | Device ID | 7362 |
| | Device mode | Mode = MANUAL |
| | Timestamp data | 12-Jul-2008; 09:35:18 |
| | Actuation duration | 0.4 sec |
| | Start actuation location data | 2650.9256, N, 08003.5234, W |
| | End actuation location data | 2650.9256, N, 08003.5226, W |
| | Locate mode | Mode = PEAK |
| | Signal strength (% of maximum) | 85% |
| | Signal frequency | 1 kHz |
| | Facility depth | 3.4 meters |
| | Marking material data | Color = RED, Brand = ABC |
| | Locate request data | Requestor = XYZ Construction Company, Requested service address = 222 Main St, Orlando, FL |
| Record #1003 | Service provider ID | 0482 |
| | User ID | 4815 |
| | Device ID | 7362 |
| | Device mode | Mode = MANUAL |
| | Timestamp data | 12-Jul-2008; 09:35:21 |
| | Trigger pull duration | 0.5 sec |
| | Start actuation location data | 2650.9273, N, 08003.5193, W |

TABLE 5-continued

Electronic Record for Combination Locate and Marking Device

|  |  |  |
|---|---|---|
|  | End actuation location data | 2650.9281, N, 08003.5190, W |
|  | Locate mode | Mode = PEAK |
|  | Signal strength (% of maximum) | 85% |
|  | Signal frequency | 1 kHz |
|  | Facility depth | 3.4 meters |
|  | Marking material data | Color = RED, Brand = ABC |
|  | Locate request data | Requestor = XYZ Construction Company, Requested service address = 222 Main St, Orlando, FL |
| Record #1004 | Service provider ID | 0482 |
|  | User ID | 4815 |
|  | Device ID | 7362 |
|  | Device mode | Mode = MANUAL |
|  | Timestamp data | 12-Jul-2008; 09:35:25 |
|  | Actuation (actuation) duration | 0.5 sec |
|  | Start actuation location data | 2650.9321, N, 08003.5177, W |
|  | End actuation location data | 2650.9325, N, 08003.5176, W |
|  | Locate mode | Mode = PEAK |
|  | Signal strength (% of maximum) | 85% |
|  | Signal frequency | 1 kHz |
|  | Facility depth | 3.4 meters |
|  | Marking material data | Color = RED, Brand = ABC |
|  | Locate request data | Requestor = XYZ Construction Company, Requested service address = 222 Main St, Orlando, FL |

While the collection and logging of locate information and marking information to generate an electronic record is discussed in some aspects, for purposes of illustration, in terms of actuation data sets (i.e., a set of data that is associated and logged with a corresponding actuation of a locate device, marking device, or combined locate and marking device), it should be appreciated that electronic records as discussed herein are not limited in this respect. More generally, an electronic record of a locate and/or marking operation may be generated in any of a variety of manners, have a variety of file formats and/or data structures, and include any of a variety of locate information and/or marking information (some of which may be germane to one or more actuations of a device, some of which may be common to multiple actuations or the overall locate and/or marking operation in general, and some of which may not be related to specific actuations). For example, in some exemplary implementations electronic records may be a "flat files" including a succession of time stamped "event entries" of various locate information and/or marking information (logged automatically as a result of one or more particular conditions, e.g., exceeded thresholds for various signals, or manually as a result of user actuation of a device), or a differently formatted file (e.g., an ASCII file, an XML file) having a data structure that segregates or separates in some manner the locate information and/or marking information into multiple different fields.

It should also be appreciated that one or both of the marking device data 1252 and locate receiver data 1254 of locating equipment data 1250, received from any of the marking devices, locate devices, or combined locate and marking devices referenced above, may include landmark information (in addition to, or alternatively to, locate information and marking information). Landmark information may include any information relating to one or more environmental landmarks of interest (e.g., in and around the work site/dig area and/or generally in the vicinity of the locate and marking operation). Examples of landmark information include, but are not limited to, geo-location data of an environmental landmark, type of environmental landmark, and a time stamp for any acquired information relating to an environmental landmark. In some instances, landmark information may be acquired from locate equipment particularly configured to operate in a landmark mode so as to acquire such information, as well as one or more other modes (e.g., "locate mode" or "marking mode") to accomplish functions relating to detection and/or marking of underground facilities.

Tables 6A and 6B below show examples of landmark information that may be included in an electronic record forming part of either marking device data 1252 or locate receiver data 1254 of locating equipment data 1250. Table 6A shows the format and content of an electronic record entry for a utility pole, which includes one geo-location data point, and Table 6B shows the format and content of an electronic record entry for a pedestal, which includes four geo-location data points (i.e., one for each corner of the pedestal). As noted above, it should be appreciated that the format and content shown below in Tables 6A and 6B is provided primarily for purposes of illustration, and that a variety of formats and content may be employed for an electronic record entry for landmark information.

TABLE 6A

Example record of landmark information acquired for a utility pole

|  |  |  |
|---|---|---|
| Record #1 | Service provider ID | 0482 |
|  | User ID | 4815 |
|  | Device ID | 7362 |
|  | Type of EL | Type = utility pole |
|  | timestamp data | 12-Jul-2008; 09:35:17.5 |
|  | geo-location data | 2650.9256, N, 08003.5234, W |
|  | Locate request data | Requestor: XYZ Construction Company, Requested service address: 222 Main St, Orlando, FL |

TABLE 6B

Example record of landmark information acquired for a pedestal

|  |  |  |
|---|---|---|
| Record #2 | Service provider ID | 0482 |
|  | User ID | 4815 |
|  | Device ID | 7362 |
|  | Type of EL | Type = pedestal |
|  | Timestamp data | 12-Jul-2008; 09:35:17.5 |
|  | geo-location data | 2650.9256, N, 08003.5234, W |
|  | Type of EL | Type = pedestal |
|  | Timestamp data | 12-Jul-2008; 09:35:21.2 |
|  | geo-location data | 2650.9256, N, 08003.5226, W |
|  | Type of EL | Type = pedestal |
|  | Timestamp data | 12-Jul-2008; 09:35:26.7 |
|  | geo-location data | 2650.9288, N, 08003.5188, W |
|  | Type of EL | Type = pedestal |
|  | Timestamp data | 12-Jul-2008; 09:35:33.5 |
|  | geo-location data | 2650.9321, N, 08003.5177, W |
|  | Locate request data | Requestor: XYZ Construction Company, Requested service address: 222 Main St, Orlando, FL |

D. Electronic Manifests

Electronic Manifest (EM) application 1260 of data sources 1216 is a computer software application that may be used to create an electronic manifest of a locate and/or marking operation. As discussed above, an electronic manifest may include a digital (e.g., aerial) image of the work site/dig area and its surroundings, upon which may be overlaid any of a variety of information relating to a locate and/or marking operation (e.g., derived from any of the information discussed above in connection with electronic records generated by various locate equipment). In one example of an electronic manifest, one or more "electronic locate marks" are overlaid on a digital image for indicating corresponding physical locate marks that have been placed on the ground, pavement or other surface at the site, thereby indicating the geo-locations and types of facilities present. One or more landmarks also may be indicated on the digital image together with the electronic locate marks. Via the EM application 1260, the digital images may be marked up "manually" by a technician (e.g., using a stylus or other type of user interface in conjunction with the digital image displayed in a display field) to include one or more electronic locate marks and/or one or more identifiers for environmental landmarks. Alternatively, a digital image may be marked up "automatically" by importing data, for example, from one or more pieces of locate equipment (e.g., a locate device, a marking device, or a combined locate and marking device) and overlaying the imported data on the digital image.

In one example, the starting digital images to be marked up using EM application 1260 may be VWL images 1232 that are associated with tickets 1220. In this manner, the resulting EM image may contain the original dig area indicator (e.g., from the VWL image) to indicate or delimit the dig area for the locate and marking operation, together with any electronic locate marks and/or landmarks added to the image via the EM application. The marked up digital images may be saved as, for example, EM images 1262, which may be associated with, for example, tickets 1220 and may be used by locate companies to support proof of work compliance. In some embodiments, EM application 1260 may implemented as described in U.S. patent application Ser. No. 12/369,232, filed Feb. 11, 2009 entitled "Searchable records of underground facility locate marking operations," which is incorporated by reference herein in its entirety.

As noted above in connection with VWL images 1232 provided by VWL application 1230, an EM image 1262 may include metadata corresponding to any markings or content in the image; in particular, geographic coordinates (e.g., latitude and longitude values) for any dig area indicator, electronic locate marks, and/or landmarks marked on the image may accompany or be included in an image file as metadata. Accordingly, these geographic coordinates, as well as any other information provided by EM application, may be employed in some manner as part of a quality assessment process (e.g., as field information/data, or in some instances as reference information/data, or in some instances to pre-process or filter one or both of field information/data and reference information/data prior to comparison).

Figure 5:
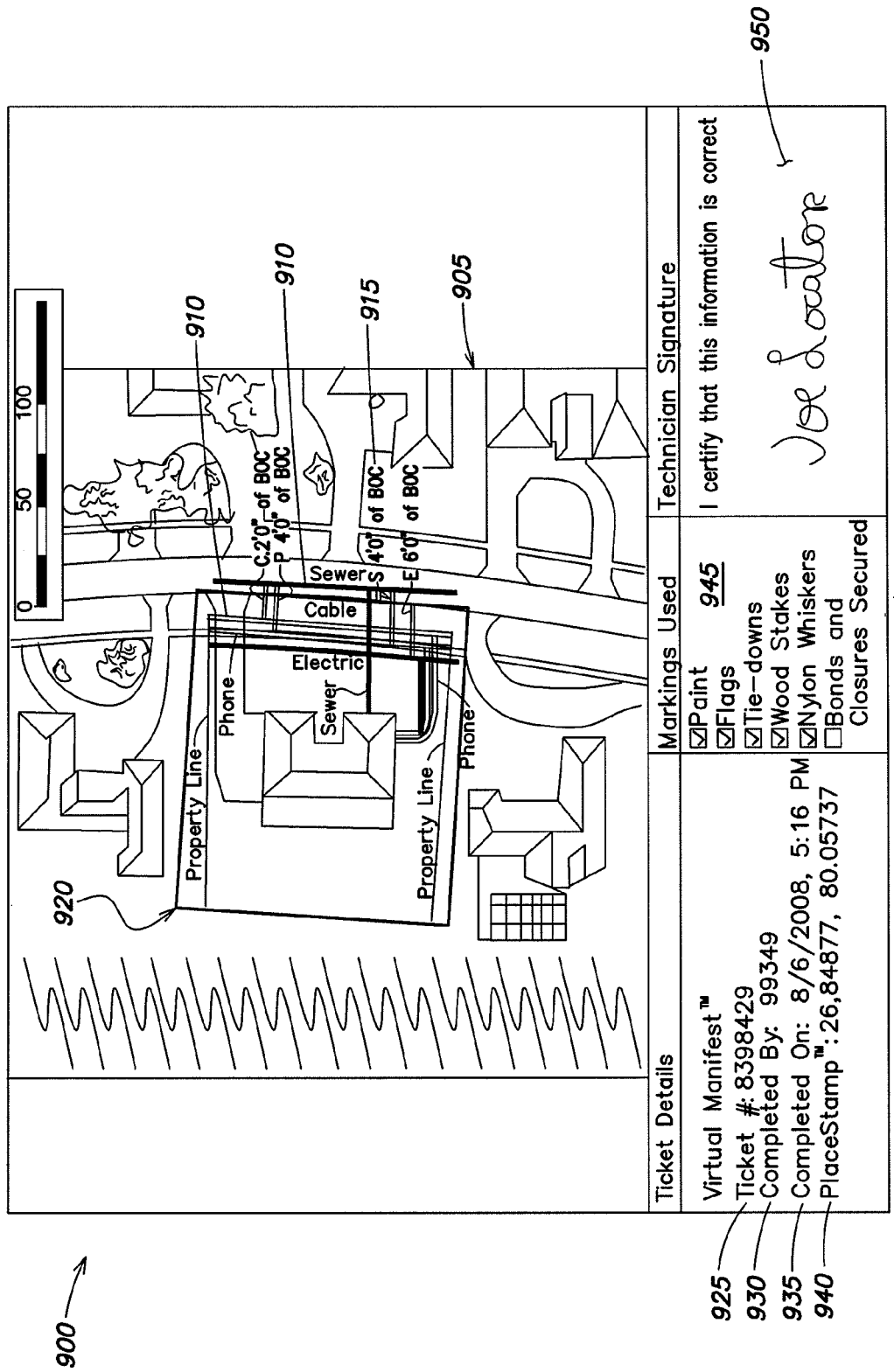
FIG. 5 illustrates an electronic manifest comprising both image data and non-image data relating to a locate and/or marking operation, in accordance with some embodiments of the present disclosure.

FIG. 5 shows an example of an electronic manifest 900 that comprises both image data and non-image data. In this example, the electronic manifest 900 comprises a marked-up image 905 showing locate mark indicators 910 (e.g., to indicate locations of physical locate marks), offset indicia 915 (e.g., to indicate distances between physical locate marks and certain environmental landmarks) and dig area indicators 920 (e.g., as provided by an excavator on a VWL image). In addition, the electronic manifest 900 comprises non-image information relating to the locate and/or marking operation, such as a ticket number or identifier 925, a name or identifier 930 associated with the locate technician (which may indicate facility owner/operator, or locate company/technician), a time and date stamp 935 indicating when the electronic manifest was created, a location stamp 940 indicating where the electronic manifest was created, a completed checklist 945 of markings used in the locate and/or marking operation, and a locate technician signature 950 certifying that the information of the electronic manifest is correct.

Although FIG. 5 shows an example of an electronic manifest including specific types of ticket information, it should be appreciated that an electronic manifest as described herein is not limited in this regard, and may alternatively include other combinations of ticket information. Also, an electronic manifest may be displayed and/or formatted in manners different from the example shown in FIG. 5.

The underlying electronic data used to generate an electronic manifest (e.g., the electronic manifest 900 shown in FIG. 5) may be represented and/or stored in any suitable manner, as the present disclosure is not limited in this respect. In some embodiments, the marked-up image(s) and the non-image information may be stored as a single file. For example, the non-image information may be included as metadata associated with the marked-up image(s). In other embodiments, the marked-up image(s) and the non-image information may be formatted as separate data sets and may be transmitted and/or stored separately. In another aspect, whether transmitted/stored separately or together, the marked-up image(s) and the non-image information may be linked together in some manner as relating to a common electronic record.

FIG. 6 shows an example of a data set 1000 that may be used to generate an electronic manifest. In this example, the data set 1000 may include a timestamp field 1010, a facility type identifier field 1020, a facility mark location field 1030, an environmental landmark identifier field 1040, an environmental landmark location field 1050, an other information field 1060, a facility owner/operator field 1065, a marking method field 1070, a property address field 1080, a ticket number field 1090, a location stamp field 1015, and a certification field 1025.

Although FIG. 6 shows specific examples of information fields, it should be appreciated that the present disclosure is not limited in this regard. In other implementations, the data set 1000 may include additional, fewer, or different fields. Some exemplary information fields are discussed briefly below.

Figure 10:
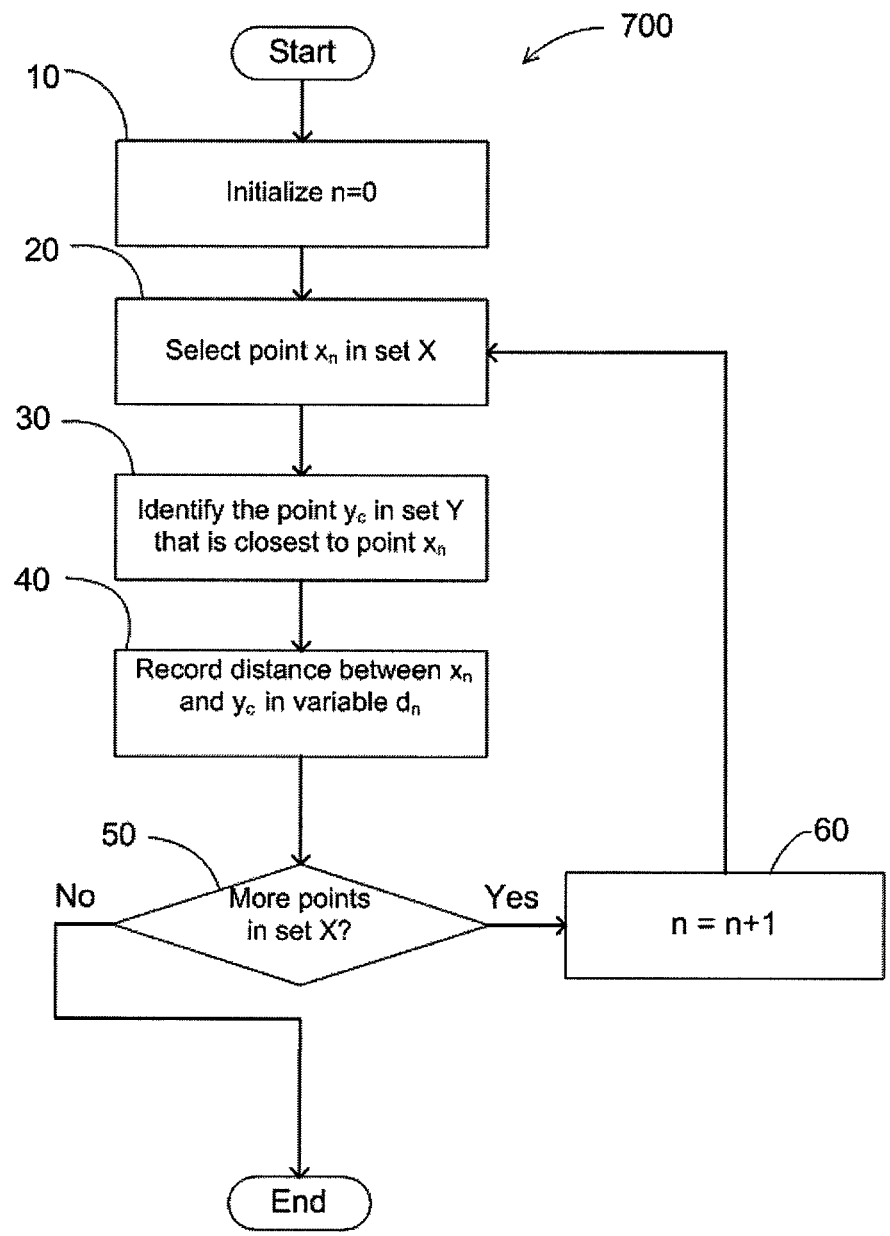
FIG. 10 illustrates a flow diagram of an example of a process for determining the distance between two sets of geo-location points, in accordance with some embodiments of the present disclosure.

The timestamp field 1010 may include time data that identifies the day and/or time that a locate and/or marking operation is performed. This may coincide with a time at which an environmental landmark location is identified in connection with the dig area. The time data in the timestamp field 1010 is shown in FIG. 10 as 9:43 a.m. on Oct. 20, 2005, although any type of date and/or time code may be used. The information in timestamp field 1010 may be useful in establishing when a locate and/or marking operation occurred.

The facility type identifier field 1020 may include an identifier that identifies a type of underground facility that is being marked. The identifier in the facility type identifier field 1020 is shown in FIG. 10 as "power," although any type of identifier may be used. The facility mark location field 1030 may include geographical information corresponding to a physical locate mark. In some implementations, the geographical information may identify a set of geographical points along a marking path of a located facility line. The geographical information in the facility mark location field 1030 is shown in FIG. 10 as N38°51.40748, W077°20.27798; . . . ; N38°51.40784, W077°20.27865, although any type of geographical information may be used.

The information in the facility mark location field 1030 may be useful in graphically presenting the facility locate marks on a map, and/or to verify that the locate and/or marking operation was actually and accurately performed. Additionally, or alternatively, the facility mark location field 1030 may include geographical information for multiple facility locate marks.

The environmental landmark identifier field 1040 may include an identifier that identifies a type of environmental landmark being marked. The identifier in environmental landmark identifier field 1040 is shown in FIG. 10 as "curb," although any type of identifier may be used. The environmental landmark location field 1050 may include geographical information corresponding to the environmental landmark identified in the environmental landmark identifier field 1040. The geographical information in the environmental landmark location field 1050 is shown in FIG. 10 as N38°51.40756, W077°20.27805; . . . ; N38°51.40773, W077°20.27858, although any type of geographical information may be used.

The other information field 1060 may store any other data that may be useful, including user notes, such as offset or distance information that identifies a distance between one or more environmental landmarks and one or more facility locate marks. The other information field 1060 is shown in FIG. 10 as including "1.2 meters between curb and power line," although any other data may be used. Additionally, or alternatively, the other information field 1060 may include audio/voice data, transcribed voice-recognition data, or the like to incorporate user notes.

E. Facilities Maps

Facilities maps 1280 of data sources 1216 are any physical, electronic, or other representation of the geographic location, type, number, and/or other attributes of a facility or facilities. Facilities maps 1280 may be supplied by the various facility owners and may indicate the geographic location of the facility lines (e.g., pipes, cables, and the like) owned and/or operated by the facility owner. For example, facilities maps 1280 may be supplied by the owner of the gas facilities, power facilities, telecommunications facilities, water and sewer facilities, and so on. In the process of performing the automatic quality assessment, information processing component 1210 may aggregate the information that is contained in multiple facilities maps 1280 in order to determine all the facilities that are present in and around a certain work site/dig area.

As indicated above, facilities maps may be provided in any of a variety of different formats. As facilities maps often are provided by facility owners of a given type of facility, typically a set of facilities maps includes a group of maps covering a particular geographic region and directed to showing a particular type of facility disposed/deployed throughout the geographic region. One facilities map of the set of maps is sometimes referred to in the relevant arts as a "plat."

Perhaps the simplest form of facilities maps is a set of paper maps that cover a particular geographic region. In addition, some facilities maps may be provided in electronic form. An electronic facilities map may in some instances simply be an electronic conversion (i.e., a scan) of a paper facilities map that includes no other information (e.g., electronic information) describing the content of the map, other than what is printed on the paper maps.

Alternatively, however, more sophisticated facilities maps also are available which include a variety of electronic information, including geographic information and other detailed information, regarding the contents of various features included in the maps. In particular, facilities maps may be formatted as geographic information system (GIS) map files, in which map features (e.g., facility lines and other features) are represented as shapes and/or lines, and the file provides metadata describing the geographic locations and types of map features. In some examples, a GIS map file may indicate a facility line using a straight line, and may include some symbol or other annotation (e.g., a diamond shape) at each endpoint of the line to indicate where the line begins and terminates. From the foregoing, it should be appreciated that in some instances, given that the geo-locations of two termination or end-points of a given facility line may be provided by the map, the geo-location of any point on the facility line may be determined from these two end-points.

Examples of a wide variety of environmental landmarks that may be represented in a GIS facilities map file include, but are not limited to: landmarks relating to facilities such as pedestal boxes, utility poles, fire hydrants, manhole covers and the like; one or more architectural elements (e.g., buildings); and/or one or more traffic infrastructure elements (e.g., streets, intersections, curbs, ramps, bridges, tunnels, etc.). A GIS facilities map file may also include various shapes or symbols indicating different environmental landmarks relating to facilities, architectural elements, and/or traffic infrastructure elements.

Examples of information provided by metadata for the map file (i.e., included as part of the electronic file for the map) include, but are not limited to, information about the geo-location of various points along a given line, the termination points of a given line (e.g., the diamond shapes indicating the start and end of the line), the type of facility line (e.g., facility type and whether the line is a service line or main), geo-location of various shapes and/or symbols for other features represented in the map (environmental landmarks relating to facilities, architectural elements, and/or traffic infrastructure elements), and type information relating to shapes and/or symbols for such other features.

Facilities maps may include additional information that may be useful to a quality assessment process. For example, various information that may be included in a legend of the facilities map, or otherwise associated with the facilities map (e.g., included in the metadata or otherwise represented on the map), and available for use in a quality assessment process, may include, but is not limited to, a date of the facilities map (e.g., when the map was first generated/created, and/or additional dates corresponding to updates/revisions), a number of revisions to the facilities map (e.g., revision number, which may in some instances be associated with a date), one or more identifiers for a source, creator, owner and/or custodian of the facilities map (e.g., the owner of the facility type represented in the map), various text information (e.g., annotations to update one or more aspects or elements of the map), and any other legend information that may be included or represented in the map.

Figure 7:
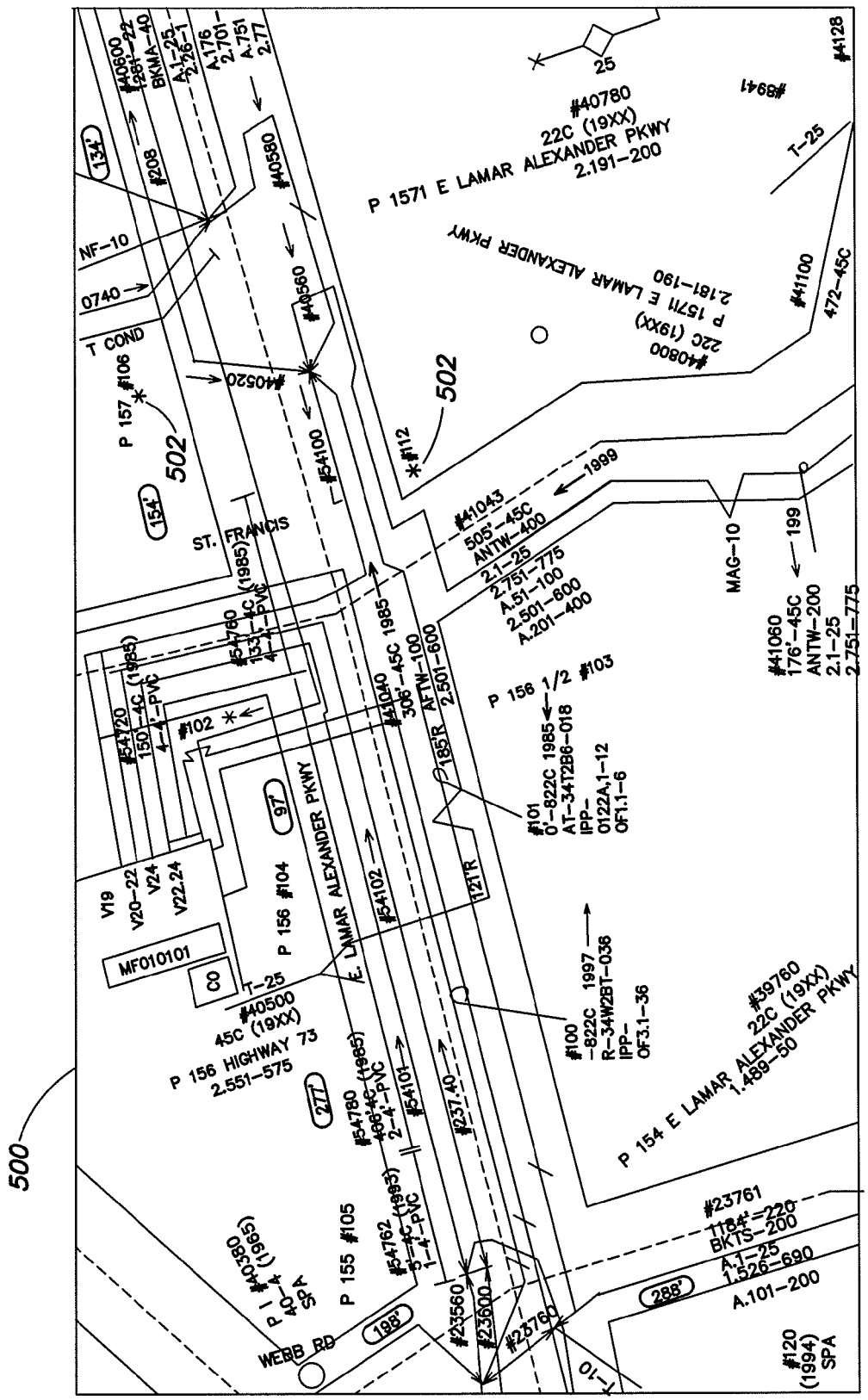
FIG. 7 is an example of a facilities map from which information relating to environmental landmarks may be obtained.

FIG. 7 shows an example of a visual representation of a portion of an electronic facilities map 500. In this example, facilities map 500 is a telecommunications facilities map that is supplied by a telecommunications company. Facilities map 500 shows telecommunications facilities in relation to certain landmarks, such as streets and roads, using lines and shapes. As discussed above, the electronic facilities map may include metadata indicating what various lines, symbols and/or shapes represent, and indicating the geo-location of these lines, symbols and/or shapes. With respect to exemplary environmental landmarks, facilities map 500 may include both visual information and metadata relating to utility poles 502, manhole 504, and any of a variety of other landmarks that may fall within the geographic area covered by the facilities map 500.

IV. Exemplary Automated Assessment Methods

Figure 8:
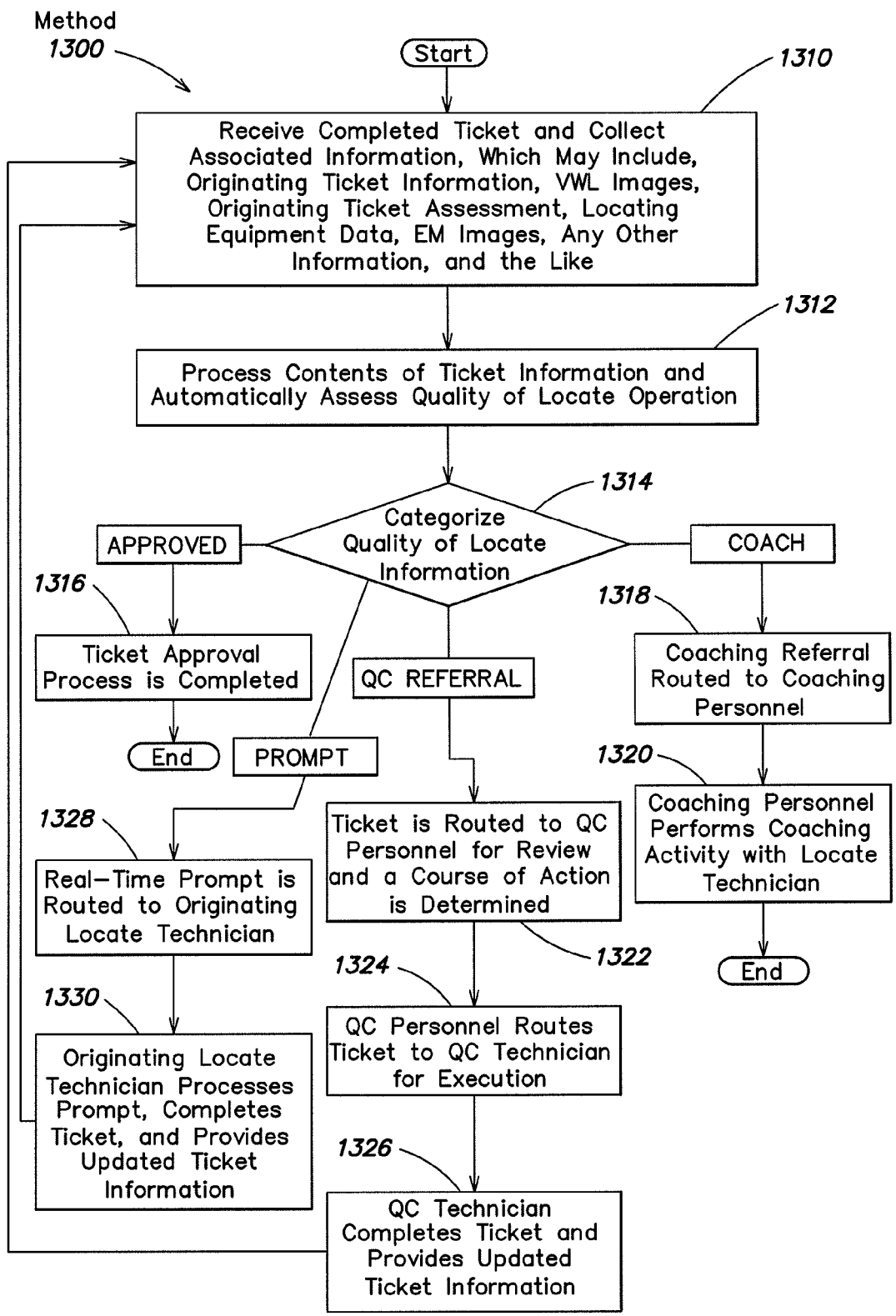
FIG. 8 illustrates a flow diagram of an example of a method of automatically performing quality control in underground facility locate applications using the automated quality assessment system, in accordance with some embodiments of the present disclosure.

FIG. 8 shows a flow diagram of an exemplary process 1300 for performing a quality assessment of an underground facility locate and/or marking operation, as implemented by automated quality assessment application 1200. While the example provided in FIG. 8 is a more specific example of the generic process 1900 discussed above in connection with FIG. 3, and describes an automated quality assessment based on a completed or closed ticket for which it is presumed that a locate and/or marking operation was actually performed by a technician, it should be appreciated that the concepts generally outlined in the process 1300 may be applied to various types of available information relating to a requested locate operation and marking operation, whether performed separately or in tandem, and irrespective of actual performance of the locate operation and/or the marking operation, so as to assess the quality of the requested operation.

Process 1300 begins at act 1310, where a completed (i.e., closed) ticket is received and associated information to be used in assessing the quality of the locate and marking operation performed in connection with the ticket is collected by automated quality assessment application 1200. The associated ticket information may include, for example, the originating ticket information (e.g., textual ticket information 1222 of a certain ticket 1220), and one or more of the VWL images (e.g., a VWL image 1232 of a certain ticket 1220), the originating ticket assessment (e.g., a ticket assessment outcome 1242 of a certain ticket 1220), the locating equipment data (e.g., marking device data 1252 and/or locate receiver data 1254 of a certain ticket 1220), the EM images (e.g., a EM image 1262 of a certain ticket 1220), and any other information (e.g., from other electronic information and/or records 1295).

The process then continues to act 1312, where the received information is used to automatically assess the quality of the locate and marking operation. In the example of FIG. 8, a locate operation is categorized as either (a) APPROVED—the operation is approved, no further action needed; (b) SATISFACTORY—the operation is approved, but the locate technician needs coaching or training; (c) UNSATISFACTORY—the operation is not approved, the ticket needs QC action; or (d) PROMPT—an aspect of the operation assessment may be suitable for transmitting a real-time prompt to the locate technician with respect to, for example, performing a substantially immediate verification and/or corrective action. However, the invention is not limited in this respect, as any suitable indication of quality may be provided as a result of an automatic quality assessment, such as, a numerical score (e.g., a score from 0-100%), a letter grade, another type of graduated indictor based on some scale or range, or any other indication of quality. Additional details and examples of how quality may be automatically assessed at act 1312 and an indication (e.g., a categorization) of quality may be automatically generated at act 1314 are discussed below. It should be appreciated that the invention is not limited to these particular examples, and that such examples are provided primarily for the purposes of illustration.

V. Assessments Relating To Environmental Landmarks

In some embodiments, the quality assessment of a locate and/or marking operation performed in act 1312 of FIG. 8 may be based entirely or in part on a comparison of information about the performance of the locate and/or marking operation (e.g., "field information," i.e., one or more of locate information, marking information, landmark information and EM information, obtained from one or more of a locate device, a marking device, a combination locate and marking device, and an EM application executing on any of a variety of computing devices) and reference information relating to one or more environmental landmarks. In exemplary embodiments in which the reference information comprises data relating to one or more environmental landmarks ("landmark information," e.g., geographic information and/or landmark category/type information relating to one or more environmental landmarks), a variety of assessments are possible.

For example, in a first embodiment relating to environmental landmarks, field information including geographic information, facility type information, and/or other information relating to an underground facility identified and/or marked during a locate and/or marking operation may be compared to reference information comprising landmark information to determine whether or not the location and/or type of one or more facilities identified and/or marked during the locate and/or marking operation are expected in view of the location and/or type of one or more environmental landmarks. Such a comparison may include identifying at least one correspondence or discrepancy between the compared data based on or more criteria. The landmark information may be derived, for example, from one or more facilities maps, one or more historical tickets, or may be collected together with (e.g., essentially concurrently with) various information relating to the locate and/or marking operation (the locate and/or marking operation to be assessed may include acquisition of landmark information relating to one or more environmental landmarks, and this landmark information may be used for the assessment).

In a second exemplary embodiment relating to environmental landmarks, "new" landmark information collected as part of a current/recent locate and/or marking operation (e.g., via a suitably configured marking device, locate device, or combined locate and marking device, and/or indicated on an electronic manifest for the locate and/or marking operation) may be compared to "reference" landmark information. The reference landmark information may be derived, for example, from one or more facilities maps or one or more historical tickets (which themselves may include previous electronic manifests), and such a comparison may serve as a basis for assessment. In one aspect of this embodiment, both "new" landmark information and other information relating to the locate and/or marking operation (e.g., geographic information, facility type information, etc.) may be compared to the reference landmark information and other facility-related information derived from one or more facilities maps, one or more historical tickets, or other information sources, such that an assessment is based both on a comparison of environmental landmarks and facilities.

In some exemplary embodiments discussed in greater detail below, geographic information in the field data is compared to geographic information in the reference data. For example, field geo-location data (e.g., one or more sets of latitude and longitude coordinates) relating to the detection and/or marking of a given underground facility or other activity during a locate and/or marking operation, and/or field geo-location data relating to one or more environmental landmarks, may be compared to reference geo-location data relating to one or more environmental landmarks.

More specifically, in some implementations, latitude and longitude coordinates corresponding to a detected and/or marked facility, and/or latitude and longitude coordinates corresponding to one or more environmental landmarks (field geo-location data), are compared to latitude and longitude coordinates (transformed if necessary to a common reference frame) relating to one or more environmental landmarks (reference geo-location data). In this manner, a correspondence or discrepancy (or degree of correspondence) may be ascertained between the field geo-location data and the reference geo-location data.

As discussed in greater detail below, a first set of field latitude and longitude coordinates, constituting lines or curves representing underground facilities detected and/or marked during the locate and/or marking operation, and/or one or more latitude and longitude coordinates constituting points or polygons representing environmental landmarks, may be compared to a corresponding set of reference latitude and longitude coordinates to determine a degree of matching between the two sets, in a manner akin to pattern matching. Additionally or alternatively, such sets of points may be compared to determine some relationship between the sets of points that bears upon an assessment (e.g., do the end points of a given facility line of a particular facility type essentially correspond to a geographic location of one or more environmental landmarks relating to that facility type?). This may be useful in determining not only how closely the locate marks formed by the technician correspond to the presumed physical location(s) of the underground facilities, but also if the detection and/or marking of a particular facility line "makes sense" in the context of its environment, based on various landmarks in the environment.

Although comparisons of field geo-location data and reference geo-location data to facilitate an automated quality assessment process are described in some exemplary embodiments discussed in greater detail below, it should be appreciated that more generally, in other embodiments, a variety of other information contained in field information/data and reference information/data may be used as a basis for an automated quality assessment. For example, field information pertaining to the number and/or types of facilities detected and/or marked during a locate and/or marking information, and/or the number and/or types of environmental landmarks present (or that no landmarks are present), may be compared to similar reference information derived from one or more facilities maps, historical tickets, etc., without regard to geographic information (e.g., by noting from various sources of reference information what types of landmarks are present or not present corresponding to a given work site/dig area, and/or how many landmarks of a particular type are present or not present). In this respect, it should be appreciated that the absence of landmarks in a given geographic area, or absence of landmarks of a particular type in a given geographic area, constitutes useful landmark information. For example, field data relating to the a marked facility line that terminates at a point at which there is no landmark present (e.g., of an appropriate category and/or type for the facility line in question) may indicate an erroneous or incomplete marking operation; in this sense, the reference information relating to one or more environmental landmarks includes information about the absence of any landmarks (e.g., in a location where one might otherwise be expected).

In another example, field information pertaining to an arrangement or pattern (i.e., relative positions) of multiple lines for a same type of facility, multiple different facility types detected and/or marked during a locate and marking information, and/or multiple environmental landmarks may be compared to similar reference information ("relative position information") derived from any one or more sources of reference information pertaining to environmental landmarks, irrespective of the presumed physical geographic location(s) of the respective facilities/lines/landmarks (i.e., the general pattern of lines and/or landmarks detected and/or marked in the field may be compared to the general pattern of landmarks as represented in reference information). The foregoing and other examples of assessments based on different types of information relating to environmental landmarks is discussed in further detail below in connection with various embodiments.

Figure 9A:
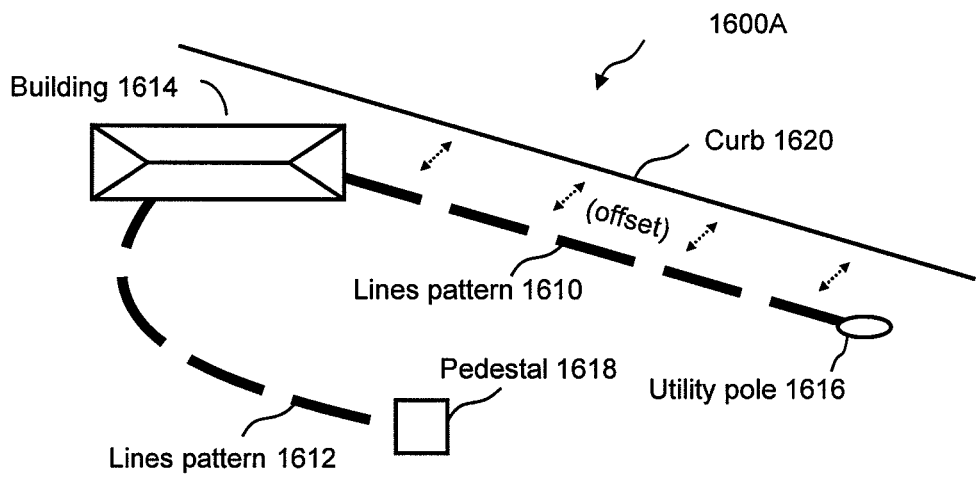
FIGS. 9A and 9B illustrate electronic visual renderings of locate and/or marking operations to facilitate an explanation of exemplary concepts relating to assessment based on landmark information, in accordance with some embodiments of the present disclosure.
Figure 9B:
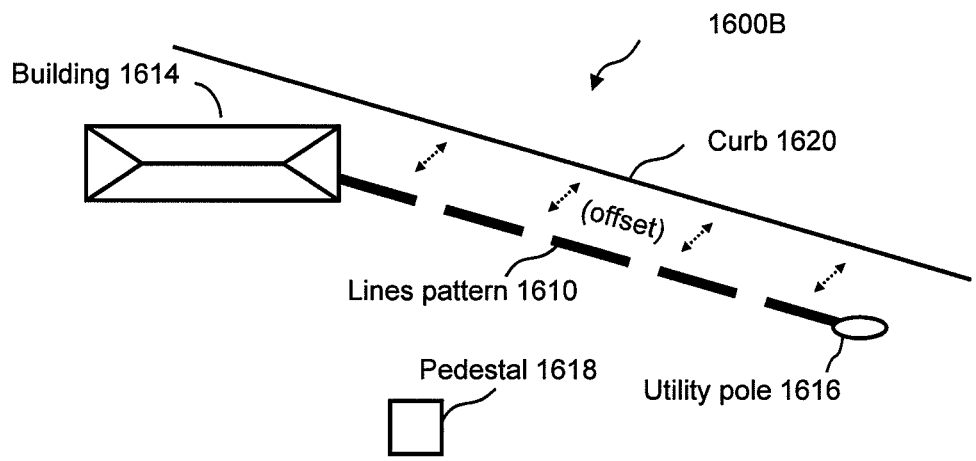

FIGS. 9A and 9B provide illustrative depictions based on various information that may be available, according to one embodiment, relating to locate and/or marking operations, which information may facilitate an assessment of the operation based at least in part on landmark information. As discussed in greater detail below, various information derived from electronic records generated by locate equipment, electronic manifests, tickets, facilities maps, and the like may be visually rendered in a display field (e.g., of a display coupled to the system 1800 shown in FIG. 2) to provide a visual aid in connection with an assessment process. In some exemplary implementations, electronic visual renderings may be provided by an EM (electronic manifest) application, as discussed above. For purposes of illustrating various concepts relating to analysis and assessment of locate and/or marking operations based on landmark information, FIG. 9A illustrates a first electronic visual rendering 1600A of a first locate and/or marking operation and FIG. 9B illustrates a second electronic visual rendering 1600B of a second locate and/or marking operation.

In FIGS. 9A and 9B, marking information (and/or locate information), as well as landmark information, are used to provide the exemplary electronic visual renderings, showing the relative positions of various elements. For example, the electronic rendering 1600A shown in FIG. 9A includes a first lines pattern 1610 representing a power line, and a second lines pattern 1612 representing a telephone line, each of which includes electronic locate marks representing corresponding physical locate marks placed on ground, pavement or other surface during a marking operation (it should be appreciated that additionally, or alternatively, locate information representing where a given underground facility was detected may be used for such electronic visual renderings). Similarly, FIG. 9A shows various identifiers (e.g., symbols, icons, lines or patterns, etc.) for multiple environmental landmarks; in particular, a building 1614, a pedestal 1618, a utility pole 1616, and a curb 1620 are shown in the electronic rendering 1600A. For purposes of the present discussion, it is presumed that geographic information (e.g., geo-location data points, such as GPS coordinates) from one or more information sources (e.g., electronic records) is available for the depicted lines pattern and the environmental landmarks, and such geographic information forms the basis for the electronic visual rendering so as to appropriately illustrate the relative positions of various elements shown.

The relative positions of electronic locate marks representing marked (and/or detected) underground facilities and one or more environmental landmarks in or proximate to the work site/dig area in which the facilities were marked (and/or detected) often provide valuable information toward assessing the accuracy and/or completeness of a locate and/or marking operation. For example, as shown in FIG. 9A, given the presence of the utility pole 1616 and the building 1614, it would be expected to encounter the lines pattern 1610, representing an electrical power line, traversing some path between the utility pole 616 and the building 1614. Furthermore, the presence and footprint of the curb 1620 may be instructive, as in some situations it would be expected to encounter some types of underground facilities (such as the power line represented by the lines pattern 1610) following the general footprint and path of the curb (e.g., running essentially parallel to the curb, perhaps at a particular offset; to this end, in some instances an environmental landmark such as the curb may provide a reference point for a "tie down" to the underground facility). Similarly, given the presence of the pedestal 1618, it would be expected to encounter the lines pattern 1612, representing a telephone line, traversing some path between the pedestal and the building.

In view of the foregoing examples, it should be appreciated that a variety of environmental landmarks may be utilized according to the inventive concepts described herein as instructive reference points to determine the feasibility and/or expectation of encountering an underground facility, and thereby facilitate an assessment of the locate and/or marking operation. For example, for the marking operation depicted in FIG. 9A, geographic information relating to the electronic locate marks representing marked utilities may be compared to geographic information relating to the environmental landmarks to assess accuracy and/or completeness. A variety of criteria and/or metrics for one or more criteria may be used in such an assessment, as discussed in greater detail below. In particular, the presence of the utility pole 1616 in or near the work site suggests that a power line should be detected and marked; the presence of the building 1614 suggests that the power line should follow some path between the utility pole and the building. Accordingly, geo-location data points representing the end points of the marked power line may be compared to geo-location data points representing one or both of the utility pole and a corner of the building (for example) to determine a degree of correspondence or discrepancy between these data points (e.g., Are the end points of the electronic locate marks for the power line within some threshold distance of the utility pole and/or the building? Does the power line extend completely between the utility pole and the building, or does it appear to terminate in the middle of nowhere?). A similar comparison may be done for geo-location data points representing the electronic locate marks for the telephone line (lines pattern 1612) and geo-location data points for the pedestal 1618 (e.g., Are the end points of the electronic locate marks for the telephone line within some threshold distance of the pedestal and/or the building?).

While the scenario illustrated in FIG. 9A provides an example of a "satisfactory" marking operation according to exemplary criteria in that facility lines are marked as expected with reference to noted environmental landmarks, the scenario illustrated in FIG. 9B illustrates an incomplete and possibly suspect or "unsatisfactory" marking operation according to some exemplary criteria. For example, an assessment method based on environmental landmarks may first note all environmental landmarks for which information is available (e.g., geo-location data for landmarks, type data for landmarks, etc.) and, for each landmark, examine other available information for any facilities detected and/or marked in or near the environmental landmark (e.g., within some radius or threshold distance of one or more geo-location data points for the landmark). If no such detected and/or marked facility is found, and indication of a suspect (e.g. may need follow-up and/or coaching) or unsatisfactory quality assessment may be provided.

With the foregoing in mind, it may be observed from FIG. 9B that, in this second marking operation represented by the electronic rendering 1600B, there is no lines pattern 1612 representing the telephone line, notwithstanding the presence of the pedestal 1618. Thus, in assessing the available information in this scenario, the presence of the pedestal 1618 without any telephone lines marked in the vicinity of the pedestal suggests that the locate and/or marking operation is perhaps incomplete, and may be indicated accordingly as suspect (e.g., needs follow-up and/or coaching) or unsatisfactory. In another example based on the foregoing, an assessment process may similarly provide an indication of a suspect or unsatisfactory locate and/or marking operation if a type of facility is found terminating at or intersecting an environmental landmark of a type that is inconsistent with the facility type (e.g., a power line terminating at or near a fire hydrant). In yet another example, an assessment process may similarly provide an indication of a suspect or unsatisfactory locate if an offset between a detected and/or marked line and an environmental landmark serving as a tie-down (e.g., the offset between the curb 1620 and the lines pattern 1610) is not within some prescribed threshold distance.

In the foregoing example, information relating to one or more facility lines detected and/or marked during a locate and/or marking operation was compared to landmark information. In another embodiment, "new" landmark information collected as part of a current/recent locate and/or marking operation (e.g., via a suitably configured marking device, locate device, or combined locate and marking device, and/or indicated on an electronic manifest for the locate and/or marking operation) may be compared to "reference" landmark information (e.g., derived from one or more facilities maps or one or more historical tickets), and such a comparison may serve as a basis for assessment. In one aspect, such an assessment may focus primarily on the consistency or inconsistency of landmark information at or near a same work site. To this end, any landmark information available in an electronic record of a locate and/or marking operation may be compared to any landmark information from available reference information; in one exemplary implementation, geographic information (e.g., geo-location data points) for any landmark represented in landmark information from the field may be compared to reference geographic information for landmarks. As with the exemplary assessments discussed above in connection with FIGS. 9A and 9B, any geographic information relating to either facility lines or environmental landmarks may be compared, in some instances on a per geo-location data point basis, to determine distances between compared points and make various assessments based thereon (e.g., is the distance between two points, or two sets of points, within some predetermined threshold).

More specifically, in one embodiment, a set of "field" geo-location data points (e.g. representing facility line or environmental landmark geographic information relating to a locate and/or marking operation) may be compared to the set of "reference" geo-location data points relating to environmental landmarks serving as a basis for assessment, to determine geographic distance between them. Such a comparison may be executed in block 1312 of one exemplary implementation of the process 1300 shown in FIG. 8.

In particular, FIG. 10 shows an illustrative process 700 for determining distance between points in two sets, X and Y, of geo-location data points (the process 700 may be executed in block 1312 of the process 1300). Each of these sets may include a plurality of geo-location data points (e.g., latitude and longitude values or x,y coordinate pairs), and the geo-location data points in set X typically are in the same reference frame (e.g., coordinate system) as the geo-location data points in set Y. In embodiments in which the process 700 is used to compare a set of field geo-location data points to a set of reference geo-location data points relating to one or more environmental landmarks, set X may include the field points and set Y may include the reference points. Process 700 defines the distance between the two sets X and Y as a vector of distances $d_0 \ldots d_n$, where each distance $d_i$ indicates the distance between a point $x_i$ in set X and the point $y_c$ in set Y that is closest to $x_i$.

Referring to FIG. 10, the illustrative process 700 begins at act 10 by initializing a variable n to zero. The process continues to act 20, where a point $x_n$ in the set X is selected, where $x_n$ is the $n^{th}$ point in the set X. The process next continues to act 30, where the point in set Y that is closest to the point $x_n$ is identified and is set as the variable $y_c$. That is, among all the points in the set Y, the selected point $y_c$ is the one closest to point $x_n$. The process then continues to act 40, where the distance between $x_n$ and $y_c$ is recorded and stored in the variable $d_n$. The process next continues to act 50, where it is determined whether there are any more points in the set X to process. When it is determined that the set X contains one or more points yet to be processed, the process 700 continues to act 60, where the value of n is incremented by one. The process then returns act 20, where the next point in the set X is selected. If, at act 50, it is determined that there are no more points in set X to process, the process 700 ends.

It should be appreciated that each of the sets X and Y may include any number of geo-location data points, as the present disclosure is not limited in this respect. For example, in some embodiments, one or both of the sets may have only one geo-location data point specifying a single point on Earth. In other embodiments, one or both sets may have multiple geo-location data points specifying multiple points on Earth.

Additionally, the process 700 may be applied to determine a measure of distance between any two sets of points in any space in which a measure of distance can be defined between two points. Thus, the application of the process 700 is not limited to geo-location data points expressed in an absolute frame of reference that ties the geo-location data to specific points on Earth. For example, in some embodiments, the geo-location data points in set X and set Y may not be expressed in latitude and longitude, but rather may be expressed as locations (e.g., distance and direction) relative to some other reference point (e.g., an arbitrary reference point, a reference point defined by one or more facilities maps, a reference point defined by some environmental landmark, or some other reference point).

The process 700 is also not limited to any particular technique for determining the distance between two points, as any of numerous techniques may be used. For example, in an embodiment where the geo-location data points are expressed in latitudinal and longitudinal coordinates, a distance between two points may be calculated according to the great-circle distance in spherical geometry, using Vincenty's inverse method for computing geographical distance between two points, or using some other method. In some embodiments in which the coordinates for the two points are each two-dimensional Cartesian coordinates in a common grid system, the straight line distance between these two points may be determined using the following formula: $d=\sqrt{(x_2-x_1)^2+(y_2-y_1)^2}$.

In embodiments in which the process illustrated in FIG. 10 is used to perform the function indicated in block 1312 of the process 1300 shown in FIG. 8, in some exemplary implementations the quality assessment may be based on the distance between any two closest points compared (e.g., a geo-location data point from the field data corresponding to a fire hydrant, and a closest geo-location data point from the reference data corresponding to a fire hydrant as represented in a facilities map covering the area of the work site). In particular, the assessment may establish a threshold distance for each pair within which the distance between the respective compared geo-location data points must fall. A unique threshold distance may be established for different pairs of points, or similar/same threshold distances may be established for groups of points or all of the data compared. Furthermore, in various implementations, the type of points compared from the field and reference data sets may be depend on the nature of the assessment; for example, in one implementation, termination points of facility lines of a particular type from the field data are compared to reference geo-location data points of environmental landmarks of a particular type to assess if the facility line(s) appropriately terminate at an expected environmental landmark.

In yet other implementations, a percentage of field geo-location data points that are within a threshold distance of corresponding reference geo-location data points may be used as a basis for assessment. That is, as discussed above, the process of FIG. 10 generates a vector of distances $d_0 \ldots d_n$, where each distance d indicates the distance between one field geo-location data point and one reference geo-location data point. Thus, in some embodiments, the quality assessment may be based on the percentage of these distances that are within some predetermined range or threshold.

Table 7 below shows one possible technique for generating a quality assessment of a locate and/or marking operation in this way using a scoring table. Techniques for generating a scoring table and computing a score using a scoring table are described in greater detail in U.S. Non-provisional patent application Ser. No. 12/493,109, filed Jun. 26, 2009, entitled "Methods and Apparatus for Quality Assessment of a Field Service Operation," incorporated by reference herein. As shown in Table 7, the criterion on which the quality of locate and/or marking operation is being assessed is listed in the leftmost column. For this criterion, the table includes one or more expected or reference values or ranges for the criterion, also referred to as "metrics," against which information about the locate and/or marking operation is measured/compared. The metrics are divided into several "scoring categories," namely, value(s)/condition(s) that, if met, result in a particular score.

For purposes of the analysis illustrated in Table 7, field information/data is referred to as ACTUAL DATA, and reference information/data is referred to as EXPECT DATA. A quality assessment for the indicated criterion is based on a comparison of the ACTUAL DATA to the EXPECT DATA (e.g., so as to determine in what scoring category the ACTUAL DATA falls as a result of the comparison). For purposes of the discussion that follows, although examples based on numeric scores are provided, the term "score" as used herein is intended to more generally denote any of a variety of graduated indicators for a quality assessment (which in turn may be based on a variety of ranges, scales and resolutions/granularity for the indicators).

TABLE 7

| Criterion | Expected value or range (metrics) | | |
|---|---|---|---|
| | Preferred | Marginal | Unacceptable |
| EXP: Distance between field landmark and reference landmark | Within 1 foot. | Within 2 feet but greater than 1 foot | Greater than 2 feet |
| ACT: Distance between field landmark and reference landmark | 8 inches | | |

In the example of Table 7, the criterion on which the quality of the locate operation is being assessed is the distance between a landmark represented in the field data, and the same type of landmark represented in the reference data. Additionally, in this example, there are three scoring categories: Preferred; Marginal; and Unacceptable. For each scoring category, there is a metric used to evaluate the contents of the distance vector $[d_0 \ldots d_n]$ resulting from the comparison of the field data and the reference data to determine in which scoring category the results of the comparison fall. In the example of Table 7, an evaluation of the distance vector shows that, for the landmark in question, the distance between the field data and the reference data was within one foot, and hence falls into the preferred category.

With reference again to act 1905 of FIG. 3 (or, similarly, act 1314 of FIG. 8), in some embodiments a score, grade, or categorization may be assigned as an output to categorize the quality assessment process based on into which scoring category the assessment falls. For example, in some embodiments, each scoring category may be associated with a number of points (e.g., 2 points for Preferred, 1 point for Marginal, and 0 points for Unacceptable), and the quality assessment may be awarded the number of points associated with the scoring category into which it falls. Thus, for example, in the example of Table 7, 2 points may be awarded, because the operation falls in the "Preferred" scoring category.

In some embodiments, the number of points awarded may be converted to a percent score that is based on the number of points awarded and a maximum possible number of points. Thus, for example, in the example of Table 7, the locate and/or marking operation received two points out of a maximum possible two points. As such, the locate and/or marking operation may be assigned a score of 2/2 or 100%. If the assessment results were to fall in the "Marginal" category and receive only one point, then it may be assigned a score of 1/2 or 50%. Similarly, if the assessment results were to fall in the unacceptable category and receive zero points, then it may be assigned a score of 0/2 or 0%.

In some embodiments, a range of percent scores may be converted to letter scores to provide an indication of quality. For example, a percent score of 100-90% may be converted to a letter score of A, 89-80% may be converted to a letter score of B, 79-70% may be converted to a letter score of C, 69-60% may be converted to a letter score of D, and <60% may be converted to a letter score of F. In yet another example, a range of percent scores may be converted to a simple PASS/FAIL score. For example, a percent score of 100-60% may be converted to a score of PASS and a percent score of <60% may be converted to a score of FAIL.

In some embodiments, the quality assessment illustrated in Table 7 may be used in the process of FIG. 8 to categorize the locate and/or marking operation as either "Approved" "Coach" or "QC Referral. For example, Table 7 may be used at act 1312 to assess the quality of the locate and/or marking operation. Based on this assessment, the quality of the operation may be categorized at act 1314. For example, if the operation falls in the "Preferred" scoring category in Table 7 it may be categorized as "Approved" at act 1314; if the operation falls in the "Marginal" scoring category, it may be categorized as "Coach;" and if the operation falls in the "Unacceptable" scoring category it may be categorized as "QC Referral."

In the example of Table 7, three scoring categories are used, such that the locate and/or marking operation is classified as either Preferred, Marginal, and Unacceptable. However, the number of scoring categories is merely illustrative, as any number of scoring categories could be used, and various mutually exclusive metrics may be assigned to these scoring categories. For example, in some embodiments, five scoring may be used (e.g., Excellent, Good, Average, Poor, Unacceptable), while in other embodiments more than five scoring categories may be used.

In addition, it should be appreciated that the distance threshold values used in the metrics in Table 7 are merely illustrative and that a variety of different percentage values and distance threshold values may be used. In some embodiments, the distance threshold values may be based on legal requirements pertaining to locate and/or marking operations. For example, some governments (e.g., state governments) may dictate certain "tolerance zones" around underground facility lines or landmarks relating to same (e.g., 12 inches, 18 inches, 24 inches, 30 inches, 36 inches, etc.). Thus, in some embodiments, one or more of the metrics used in a scoring table may be based on a tolerance zone dictated by government regulations.

VI. Visual Representations

In some embodiments, as discussed above, any of the field information and reference information available to the assessment process (from any of a variety of sources) may be visually rendered in a display field (e.g., of a display coupled to the system 1800 shown in FIG. 2) to provide a visual aid in connection with an assessment process. In some exemplary implementations, electronic visual renderings may be provided by an EM (electronic manifest) application, as discussed above. According to one aspect of this embodiment, it is particularly instructive as a visual aid to "overlay" some or all of the contents of the field information with that of the reference information in the display field, so as to provide a visual comparison of the information (e.g., as a supplement to the automated/electronic comparison of various elements of the available field and reference information). To aid in such a comparison, different facility types may be indicated in the display field, for example, by employing different colors or line types, and different environmental landmarks may be indicated in the display field, for example, by employing different colors, shapes, patterns, icons, etc.

Figure 11A:
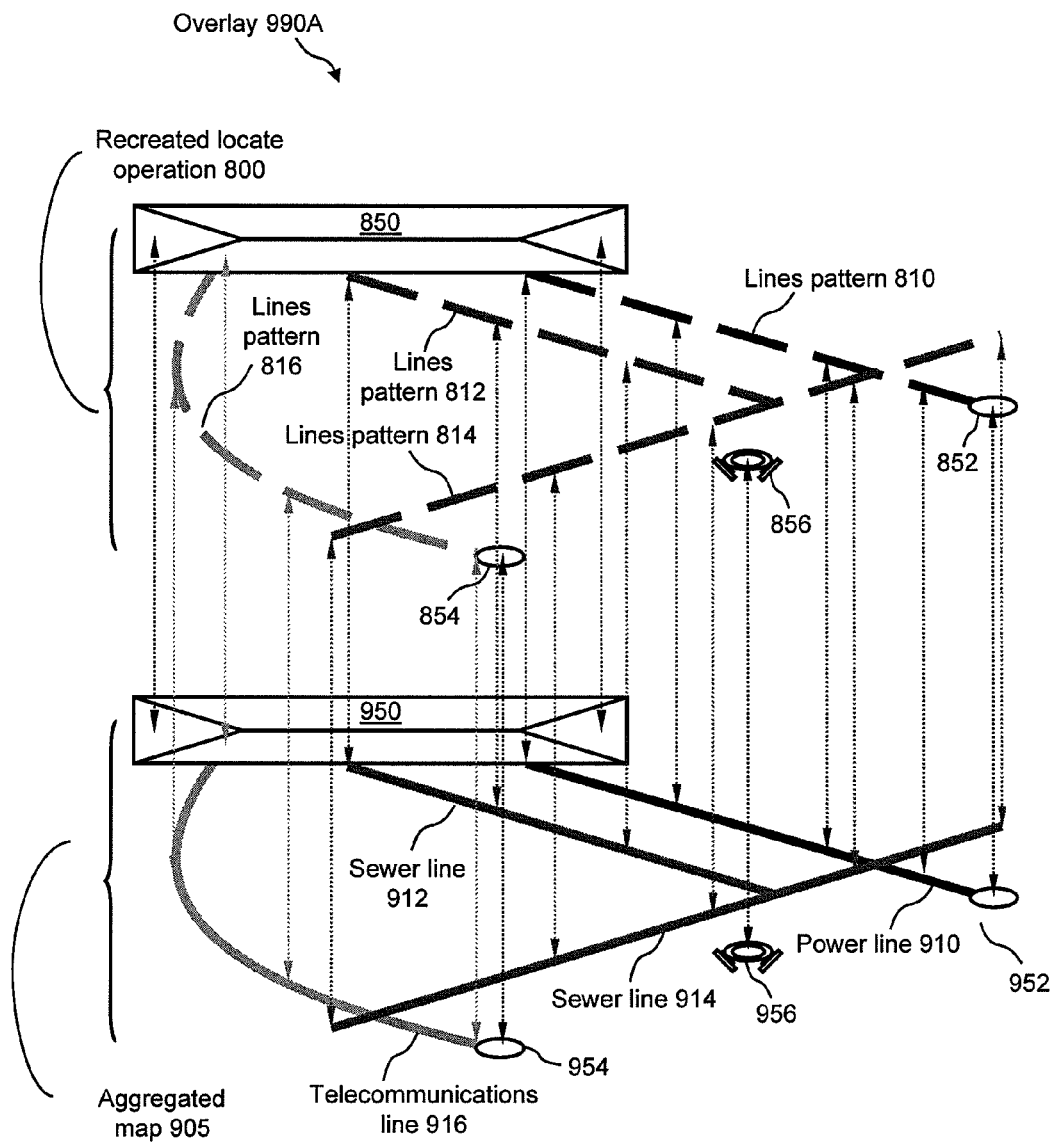
FIG. 11A is an example of a computer-aided visual rendering illustrating an overlay of field data corresponding to a locate and/or marking operation and reference data, in accordance with some embodiments of the present disclosure.

FIG. 11A illustrates an electronic visual rendering in the form of an overlay 990A for a first locate and/or marking operation, in which the field information includes marking information and landmark information (to constitute a "recreated locate operation" 800), and the reference information includes information relating to both facility lines and landmarks as derived from one or more facilities maps so as to provide an "aggregated map" 905. Each of the field information and reference information includes respective elements representing facilities lines and environmental landmarks (e.g., lines pattern 816 corresponding to telecommunications line 916, utility pole 852 corresponding to utility pole 952, lines pattern 810 corresponding to power line 910, pedestal 854 corresponding to pedestal 954, fire hydrant 856 corresponding to fire hydrant 956, etc.). From the overlay 990A of FIG. 11A, a viewer may obtain an "at-a-glance" qualitative view of the field information as compared to the reference information.

Figure 11B:
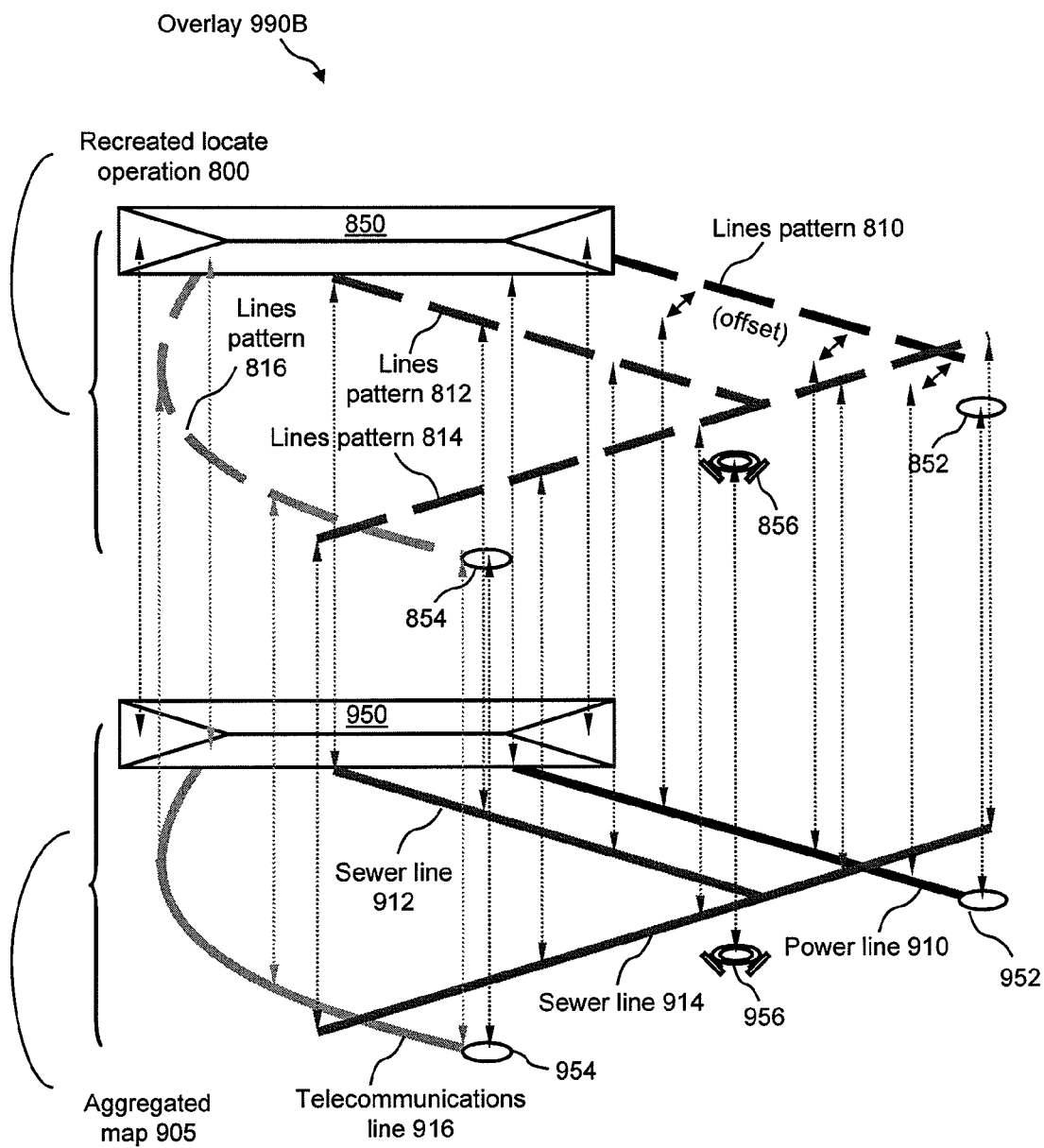
FIG. 11B is another example of computer-aided visual rendering illustrating an overlay of filed data corresponding to a different locate and/or marking operation and reference data, in accordance with some embodiments of the present disclosure.

Electronic visual renderings such as the overlay 990A shown in FIG. 11A may be useful in highlighting possible discrepancies between field information and reference information. For example, FIG. 11B illustrates another electronic visual rendering of an overlay 990B for a second locate and/or marking operation, in which the viewer may discern a discrepancy between one of the lines patterns represented by electronic locate marks based on the field information, and a corresponding facility line in the reference information. In particular, the lines pattern 810 in the recreated locate operation 800 shown in the overlay 990B of FIG. 11B is noticeably offset from what would appear to be the closest corresponding facility line, i.e., the power line 910, as represented by geographic information in the reference information. Thus, the overlay 990B provides a useful visual tool for further assessing the locate and/or marking operation based on available field information and reference information.

To further facilitate visual observations of available information from electronic renderings, in one embodiment, each of the field information/data and the reference information data, if present in a computer-aided visual rendering, as well as any constituent information forming part of the field data and the reference data, may be displayed as separate "layers" of the visual rendering, such that a viewer of the visual rendering may turn on and turn off displayed data based on a categorization of the displayed data. For example, all field data may be categorized generally under one layer designation (e.g., "Field"), and independently enabled or disabled for display (e.g., hidden) accordingly. Similarly, all reference data may be categorized generally under another layer designation (e.g., "Reference") and independently enabled or disabled for display accordingly. Respective layers may be enabled or disabled for display in any of a variety of manners; for example, in one implementation, a "layer directory" or "layer legend" pane may be included in the display field (or as a separate window selectable from the display field of the visual rendering), showing all available layers, and allowing a viewer to select each available layer to be either displayed or hidden, thus facilitating comparative viewing of layers.

Furthermore, any of the above-mentioned general categories for layers may have sub-categories for sub-layers, such that each sub-layer may also be selectively enabled or disabled for viewing by a viewer. For example, under the general layer designation of "Field," different facility types that may have been marked (and indicated in the field data by color, for example) may be categorized under different sub-layer designations (e.g., "Field—Electric;" "Field—Gas;" etc.); in this manner, a viewer may be able to hide the electric field data while viewing the gas field data, or vice versa, in addition to having the option to view or hide all field data. Sub-layer designations similarly may be employed for the reference data (e.g., "Reference—water/sewer;" "Reference—CATV"). Virtually any characteristic of the information available for display may serve to categorize the information for purposes of displaying layers or sub-layers.

VII. Conclusion

In sum, information relating to a locate and/or marking operation may be compared to a variety of information relating to one or more environmental landmarks for purposes of assessing a quality of the locate and/or marking operation. The types of field information being compared to reference information relating to one or more environmental landmarks may include geographic information, facility type information, and/or other information relating to the facilities identified and/or marked during the locate and/or marking operation, and/or landmark information acquired during a locate and/or marking operation. For example, the comparison may generally involve determining whether there is agreement between the locate and/or marking operation and information relating to one or more environmental landmarks, which may in turn involve identifying at least one correspondence or discrepancy between the compared data, and in some instances a degree of correspondence.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus to facilitate evaluating a quality of a locate and/or marking operation, performed by a field technician at a work site of proposed excavation in response to a locate request ticket, to identify a presence or an absence of at least one underground facility at the work site, wherein the locate request ticket comprises first information representative of at least one of:

an address of the work site;
   at least one expected type of the at least one underground facility;
   an expected number of the at least one underground facility;
   at least one expected owner of the at least one underground facility; and
   an expected time of the locate and/or marking operation,
   the apparatus comprising:
   at least one communication interface;
   at least one display device to provide a graphical user interface;
   at least one memory storing processor-executable instructions; and
   a processor coupled to the at least one memory, the at least one display device, and the at least one communication interface, wherein upon execution of the processor-executable instructions by the processor, the processor:
   A) controls the at least one display device to display a first portion of the graphical user interface based at least in part on the first information from the locate request ticket;
   B) controls the at least one display device to display a second portion of the graphical user interface based at least in part on second information relating to the locate and/or marking operation as performed at the work site by the field technician;
   C) generates at least one indication of a quality assessment of the locate and/or marking operation based at least in part on a comparison of at least some of the first information and at least some of the second information; and D) controls the at least one memory to electronically store, and/or controls the at least one communication interface to electronically transmit the at least one indication of the quality assessment so as to provide an electronic record of the quality assessment.

2. The apparatus of claim 1, wherein C) comprises:
C1) receiving an input, via the graphical user interface, from an approver that reviews the displayed first portion of the graphical user interface and the displayed second portion of the graphical user interface; and
C2) generating the at least one indication of the quality assessment in response to the input from the approver.

3. The apparatus of claim 1, wherein C) comprises:
automatically generating the at least one indication of the quality assessment by the processor based at least in part on the comparison of the at least some of the first information and the at least some of the second information and at least one predetermined criterion for the comparison.

4. The apparatus of claim 1, wherein upon execution of the processor-executable instructions by the processor, the processor further controls the at least one communication interface to receive the first information from the locate request ticket.

5. The apparatus of claim 1, wherein upon execution of the processor-executable instructions by the processor, the processor further controls the at least one communication interface to receive the second information from a locate and marking device as used by the field technician to perform the locate and/or marking operation.

6. The apparatus of claim 1, wherein the second information comprises a digital image of the work site.

7. The apparatus of claim 6, wherein the digital image shows at least one of a street number, a mail box, a serial number on a telephone pole, and at least one locate marking so as to verify an actual address of the work site at which the locate and/or marking operation is actually performed.

8. The apparatus of claim 6, wherein the digital image comprises GPS data indicating a location at which the digital image is taken.

9. The apparatus of claim 1, wherein the second information comprises an electronic locate manifest of the locate and/or marking operation as performed by the field technician.

10. The apparatus of claim 9, wherein the electronic locate manifest comprises an electronic image of the work site and a digital representation of at least one locate marking overlaid on the electronic image of the work site.

11. The apparatus of claim 1, wherein the at least one indication of the quality assessment of the locate and/or marking operation indicates one of:
C1) that the locate and/or marking operation is satisfactory;
C2) that the locate and/or marking operation is unsatisfactory and requires further quality control assessment and/or at least partial re-performance of the locate and/or marking operation; or
C3) that the locate and/or marking operation is satisfactory but the field technician requires coaching.

12. The apparatus of claim 11, wherein the processor further controls the at least one display device to display, on the graphical user interface, at least one icon representing the quality assessment of the locate and/or marking operation, the at least one icon including:
an approved icon representing C1);
a QC icon representing C2); and
a coach icon representing C3).

13. The apparatus of claim 11, wherein the processor, in response to C2):
further controls the at least one communicate interface to receive updated second information relating to the quality control assessment and/or the at least partial re-performance of the locate and/or marking operation; and
generates at least one updated indication of the quality assessment based at least in part on a comparison by the processor of at least some of the first information and at least some of the updated second information.

14. The apparatus of claim 11, wherein the processor, in response to C2), controls the at least one communication interface to transmit the at least one indication of the quality assessment for managerial review, if no information relating to the quality control assessment and the at least partial re-performance of the locate and/or marking operation is received within a first time period after the processor generates the at least one indication of the quality assessment.

15. The apparatus of claim 14, wherein the first time period is approximately one business day.

16. The apparatus of claim 11, wherein the processor, in response to C3), controls the at least one communication interface to transmit the at least one indication of the quality assessment for managerial review, if no information relating to the coaching is received within a second time period after the processor generates the at least one indication of the quality assessment.

17. The apparatus of claim 16, wherein the second time period is approximately ten business days.

18. The apparatus of claim 1, wherein the first portion of the graphical user interface and the second portion of the graphical user interface are displayed simultaneously so as to facilitate the comparison of at least some of the first information and at least some of the second information.

19. The apparatus of claim 1, wherein the processor further controls the at least one communication interface to transmit the electronic record of the quality assessment for managerial review.

20. A method for evaluating a quality of a locate and/or marking operation, performed by a field technician at a work site of proposed excavation in response to a locate request ticket, to identify a presence or an absence of at least one underground facility at the work site, wherein the locate request ticket comprises first information representative of at least one of:
an address of the work site;
at least one expected type of the at least one underground facility;
an expected number of the at least one underground facility;
at least one expected owner of the at least one underground facility; and
an expected time of the locate and/or marking operation,
the method comprising:
A) displaying, via at least one display device, a first portion of a graphical user interface based at least in part on the first information from the locate request ticket;
B) displaying, via the at least one display device, a second portion of the graphical user interface based at least in part on second information relating to the locate and/or marking operation as performed at the work site by the field technician;
C) generating, via at least one processor, at least one indication of a quality assessment of the locate and/or marking operation based at least in part on a comparison of at least some of the first information and at least some of the second information; and D) electronically storing via at least one memory, and/or electronically transmitting via at least one communication interface, the at least one indication of the quality assessment so as to provide an electronic record of the quality assessment.

21. The method of claim 20, wherein B) comprises:
displaying a digital image showing at least one of a street number, a mail box, a serial number on a telephone pole, and at least one locate marking so as to verify an actual address of the work site at which the locate and/or marking operation is actually performed.

22. The method of claim 20, wherein B) comprises:
displaying an electronic locate manifest of the locate and/or marking operation as performed by the field technician, wherein the electronic locate manifest comprises an electronic image of the work site and a digital representation of at least one locate marking overlaid on the electronic image of the work site.

23. The method of claim 20, wherein C) comprises:
C1) receiving an input, via the graphical user interface, from an approver that reviews the displayed first portion of the graphical user interface and the displayed second portion of the graphical user interface; and
C2) generating the at least one indication of the quality assessment in response to the input from the approver.

24. The method of claim 23, wherein:
C2) comprises generating the at least one indication of the quality assessment indicating one of:
C2a) that the locate and/or marking operation is satisfactory;
C2b) that the locate and/or marking operation is unsatisfactory and requires further quality control assessment and/or at least partial re-performance of the locate and/or marking operation; or
C2c) that the locate and/or marking operation is satisfactory but the field technician requires coaching.

25. The method of claim 24, further comprising:
E) in response to C2b), transmitting the at least one indication of the quality assessment via the at least one communication interface for managerial review, if no information relating to the quality control assessment and the at least partial re-performance of the locate and/or marking operation is received within a first time period after generating the at least one indication of the quality assessment; or
F) in response to C2c), transmitting the at least one indication of the quality assessment via the at least one communication interface for managerial review, if no information relating to the coaching is received within a second time period after generating the at least one indication of the quality assessment.

26. The method of claim 20, further comprising:
generating a plurality of indications of quality assessments of a plurality of locate and/or marking operations; and
transmitting a portion of the plurality of indications of quality assessments for managerial review, wherein the portion of the plurality of indications of quality assessments are selected based at least in part on a type of the at least one underground facility identified during the locate and/or marking operation.

27. A non-transitory computer-readable medium encoded with instructions that, when executed on at least one processor, perform a method for evaluating a quality of a locate and/or marking operation, performed by a field technician at a work site of proposed excavation in response to a locate request ticket, to identify a presence or an absence of at least one underground facility at the work site, wherein the locate request ticket comprises first information representative of at least one of:
an address of the work site;
at least one expected type of the at least one underground facility;
an expected number of the at least one underground facility;
at least one expected owner of the at least one underground facility; and
an expected time of the locate and/or marking operation,
the method comprising:
A) displaying, via at least one display device, a first portion of a graphical user interface based at least in part on the first information from the locate request ticket;
B) displaying, via the at least one display device, a second portion of the graphical user interface based at least in part on second information relating to the locate and/or marking operation as performed at the work site by the field technician;
C) generating, via at least one processor, at least one indication of a quality assessment of the locate and/or marking operation based at least in part on a comparison of at least some of the first information and at least some of the second information; and
D) electronically storing via at least one memory, and/or electronically transmitting via at least one communication interface, the at least one indication of the quality assessment so as to provide an electronic record of the quality assessment.

28. An apparatus to facilitate evaluating a quality of a locate and/or marking operation, performed by a field technician at a work site of proposed excavation in response to a locate request ticket, to identify a presence or an absence of at least one underground facility at the work site, wherein the locate request ticket comprises first information representative of at least one of:
an address of the work site;
at least one expected type of the at least one underground facility;
an expected number of the at least one underground facility;
at least one expected owner of the at least one underground facility; and
an expected time of the locate and/or marking operation,
the apparatus comprising:
at least one communication interface;
at least one display device to provide a graphical user interface;
at least one memory storing processor-executable instructions; and
a processor coupled to the at least one memory, the at least one display device, and the at least one communication interface, wherein upon execution of the processor-executable instructions by the processor, the processor:
A) controls the at least one display device to display a first portion of the graphical user interface based at least in part on the first information from the locate request ticket;
B) controls the at least one display device to display a second portion of the graphical user interface based at least in part on second information comprising an electronic locate manifest of the locate and/or marking operation as performed at the work site by the field technician, wherein the electronic locate manifest comprises an electronic image of the work site and a digital representation of at least one locate marking overlaid on the electronic image of the work site;

C) generates at least one indication of a quality assessment of the locate and/or marking operation based at least in part on a comparison of at least some of the first information and at least some of the second information; and D) controls the at least one memory to electronically store, and/or controls the at least one communication interface to electronically transmit the at least one indication of the quality assessment so as to provide an electronic record of the quality assessment, wherein the first portion of the graphical user interface and the second portion of the graphical user interface are displayed simultaneously so as to facilitate the comparison of at least some of the first information and at least some of the second information.

29. The apparatus of claim 28, wherein D) further comprises:

archiving the electronic record of the quality assessment into a work management server and/or human resources files so as to provide a performance record of the field technician.

30. The apparatus of claim 28, wherein:

the first information from the locate request ticket is representative of the address of the work site, the at least one expected type of the at least one underground facility, and the expected number of the at least one underground facility;

A) comprises displaying all of the first information in the first portion of the graphical user interface, B) comprises displaying the electronic locate manifest of the locate and/or marking operation in the second portion of the graphical user interface.

* * * * *